US009537165B2

(12) United States Patent
Ogawa et al.

(10) Patent No.: US 9,537,165 B2
(45) Date of Patent: Jan. 3, 2017

(54) FUEL CELL MODULE

(71) Applicant: HONDA MOTOR CO., LTD., Tokyo (JP)

(72) Inventors: Tetsuya Ogawa, Wako (JP); Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/784,183

(22) PCT Filed: Mar. 14, 2014

(86) PCT No.: PCT/JP2014/057945
§ 371 (c)(1),
(2) Date: Oct. 13, 2015

(87) PCT Pub. No.: WO2014/171264
PCT Pub. Date: Oct. 23, 2014

(65) Prior Publication Data
US 2016/0072142 A1 Mar. 10, 2016

(30) Foreign Application Priority Data
Apr. 18, 2013 (JP) .................................. 2013-087801

(51) Int. Cl.
*H01M 8/06* (2016.01)
*F28D 7/00* (2006.01)
(Continued)

(52) U.S. Cl.
CPC ............. *H01M 8/0618* (2013.01); *B01J 8/067* (2013.01); *C01B 3/34* (2013.01); *F24H 1/403* (2013.01);
(Continued)

(58) Field of Classification Search
CPC ............ H01M 8/0618; H01M 8/04022; H01M 8/04067; H01M 8/0631; H01M 8/0662; H01M 8/24; B01J 8/067; C01B 3/34; C01B 2208/00194; C01B 2208/00212; F24H 1/403; Y02P 20/124
See application file for complete search history.

(56) References Cited

U.S. PATENT DOCUMENTS

2001/0009732 A1 7/2001 Schuler
2008/0038622 A1* 2/2008 Valensa ............... H01M 8/2475
429/420
(Continued)

FOREIGN PATENT DOCUMENTS

JP 2001-236980 8/2001
JP 2004-059415 2/2004
(Continued)

OTHER PUBLICATIONS

This case is co-pending with U.S. Appl. No. 14/784,166, filed Oct. 13, 2015 and U.S. Appl. No. 14/784,189, filed Oct. 13, 2015.
(Continued)

*Primary Examiner* — Raymond Alejandro
(74) *Attorney, Agent, or Firm* — Rankin, Hill & Clark LLP

(57) ABSTRACT

A fuel cell module (includes a first area where an exhaust gas combustor and a start-up combustor are provided, an annular second area around the first area and where a reformer and a heat exchanger are provided, and an annular third area around the second area and where an evaporator is provided. Second circumscribed non-uniform-flow suppression plates are provided along the minimum circumscribed circles which contact outer surfaces of heat exchange pipes of the heat exchanger.

7 Claims, 17 Drawing Sheets

(51) Int. Cl.
*F28D 7/16* (2006.01)
*H01M 8/04* (2016.01)
*C01B 3/34* (2006.01)
*B01J 8/06* (2006.01)
*F24H 1/40* (2006.01)
*H01M 8/24* (2016.01)
*H01M 8/12* (2016.01)

(52) U.S. Cl.
CPC ........... *F28D 7/0066* (2013.01); *F28D 7/1607* (2013.01); *F28D 7/1676* (2013.01); *H01M 8/04022* (2013.01); *H01M 8/04067* (2013.01); *H01M 8/0631* (2013.01); *H01M 8/0662* (2013.01); *H01M 8/24* (2013.01); *B01J 2208/0053* (2013.01); *B01J 2208/00194* (2013.01); *B01J 2208/00212* (2013.01); *B01J 2208/00221* (2013.01); *B01J 2208/00716* (2013.01); *C01B 2203/0233* (2013.01); *C01B 2203/066* (2013.01); *C01B 2203/0811* (2013.01); *C01B 2203/1258* (2013.01); *C01B 2203/1288* (2013.01); *C01B 2203/141* (2013.01); *F24D 2200/19* (2013.01); *F24H 2240/10* (2013.01); *H01M 2008/1293* (2013.01); *H01M 2250/20* (2013.01); *Y02E 60/50* (2013.01); *Y02E 60/525* (2013.01); *Y02P 20/124* (2015.11); *Y02T 90/32* (2013.01)

(56) References Cited

U.S. PATENT DOCUMENTS

| | | | | |
|---|---|---|---|---|
| 2009/0087705 | A1* | 4/2009 | Fuju | C01B 3/384 429/424 |
| 2009/0263689 | A1* | 10/2009 | Homma | H01M 8/04022 429/411 |
| 2010/0021784 | A1 | 1/2010 | Fourmigue | |
| 2012/0178003 | A1* | 7/2012 | Venkataraman | H01M 2/00 429/408 |
| 2015/0270560 | A1 | 9/2015 | Ogawa et al. | |

FOREIGN PATENT DOCUMENTS

| | | |
|---|---|---|
| JP | 2004-288434 | 10/2004 |
| JP | 2008-063193 | 3/2008 |
| JP | 2010-504607 | 2/2010 |
| JP | 2014-096205 | 5/2014 |
| JP | 2014-146578 | 8/2014 |
| WO | 2013/114773 A1 | 8/2013 |
| WO | 2013/114775 A1 | 8/2013 |
| WO | 2013/187153 A1 | 12/2013 |
| WO | 2013/187154 A1 | 12/2013 |
| WO | 2014/119222 | 8/2014 |

OTHER PUBLICATIONS

International Search Report, Date of mailing: Feb. 6, 2014.

\* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. An anode is provided on one side of the solid electrolyte, and a cathode is provided on the other side of the solid electrolyte to form an electrolyte electrode assembly (MEA). The electrolyte electrode assembly is sandwiched between separators (bipolar plates) to form a fuel cell. In use, generally, predetermined numbers of the electrolyte electrode assemblies and the separators are stacked together to form a fuel cell stack.

As a system including this fuel cell stack, for example, a fuel cell battery disclosed in Japanese Laid-Open Patent Publication No. 2001-236980 (hereinafter referred to as the conventional technique 1) is known. As shown in FIG. 15, the fuel cell battery includes a fuel cell stack 1a, and a heat insulating sleeve 2a is provided at one end of the fuel cell stack 1a. A reaction device 4a is provided in the heat insulating sleeve 2a. The reaction device 4a includes a heat exchanger 3a.

In the reaction device 4a, as a treatment of liquid fuel, partial oxidation reforming which does not use water is performed. After the liquid fuel is evaporated by an exhaust gas, the liquid fuel passes through a feeding point 5a which is part of the heat exchanger 3a. The fuel contacts an oxygen carrier gas heated by the exhaust gas to induce partial oxidation reforming, and then, the fuel is supplied to the fuel cell stack 1a.

Further, as shown in FIG. 16, a solid oxide fuel cell disclosed in Japanese Laid-Open Patent Publication No. 2010-504607 (PCT) (hereinafter referred to as the conventional technique 2) has a heat exchanger 2b including a cell core 1b. The heat exchanger 2b heats the cathode air utilizing waste heat.

Further, as shown in FIG. 17, a fuel cell system disclosed in Japanese Laid-Open Patent Publication No. 2004-288434 (hereinafter referred to as the conventional technique 3) includes a first area 1c having a cylindrical shape extending vertically, an annular second area 2c around the first area 1c, an annular third area 3c around the second area 2c, and an annular fourth area 4c around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In the conventional technique 1, at the time of reforming by partial oxidation in the reaction device 4a, heat of the exhaust gas is used for heating the liquid fuel and the oxygen carrier gas. Therefore, the quantity of heat energy for heating the oxygen-containing gas supplied to the fuel cell stack 1a tends to be insufficient, and the efficiency is low. Additionally, since the heat exchanger 3a only heats the outer wall by the exhaust gas, the desired quantity of heat cannot be received. Moreover, the exhaust gas tends to flow non-uniformly.

Further, in the conventional technique 2, long flow channels are adopted to have the sufficient heat transmission area. Therefore, considerably large pressure losses tend to occur. Additionally, since the heat exchanger 2b only heats the outer wall by the exhaust gas, the desired quantity of heat cannot be received. Moreover, the exhaust gas tends to flow non-uniformly.

Further, in the conventional technique 3, radiation of the heat from the central area having the highest temperature is suppressed using heat insulation material (partition wall). Therefore, heat cannot be collected (recovered), and the efficiency is low. Additionally, since the combustion gas flows along the partition wall, the effective quantity of heat cannot be received.

The present invention has been made to solve the problems of this type, and an object of the present invention is to provide a fuel cell module having simple and compact structure in which heat is utilized efficiently, thermally self-sustaining operation is facilitated, and it is possible to suppress non-uniform flow of a combustion gas reliably and achieve improvement in the heat exchange efficiency.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of a raw fuel chiefly containing hydrocarbon and water vapor to produce the fuel gas supplied to the fuel cell stack, an evaporator for evaporating water, and supplying the water vapor to the reformer, a heat exchanger for raising the temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

The fuel cell module includes a first area where the exhaust gas combustor and the start-up combustor are provided, an annular second area around the first area and where the reformer and the heat exchanger are provided, and an annular third area around the second area and where the evaporator is provided.

Further, in the fuel cell module, the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber and another end connected to the oxygen-containing gas discharge chamber, and a combustion gas channel for supplying the combustion gas between the heat exchange pipes. In the fuel cell module, a circumscribed non-uniform-flow suppression plate is provided along a minimum circumscribed circle which contacts outer surfaces of the heat exchange pipes.

In the present invention, the first area in which the exhaust gas combustor and the start-up combustor are provided is positioned at the center. The annular second area is provided around the first area, and the annular third area is provided around the second area, successively. The reformer and the heat exchanger are provided in the second area, and the evaporator is provided in the third area.

In the structure, generation of the waste heat and heat radiation are suppressed suitably, improvement in the heat efficiency is achieved, and thermally self-sustaining operation can be facilitated. Further, simple and compact structure of the fuel cell module as a whole can be achieved. Thermally self-sustaining operation herein means operation where the operating temperature of the fuel cell is maintained using only heat energy generated in the fuel cell itself, without supplying additional heat from the outside.

Further, in the heat exchanger, the annular oxygen-containing gas supply chamber, the annular oxygen-containing gas discharge chamber, and the plurality of heat exchange pipes are provided as basic structure. Thus, simple structure is achieved easily. Accordingly, the production cost is reduced effectively. Further, by changing the volumes of the oxygen-containing gas supply chamber and the oxygen-containing gas discharge chamber, the length, the diameter, and the number of the pipes, the desired operation can be achieved depending on various operating conditions, and a wider variety of designs become available.

Further, the circumscribed non-uniform-flow suppression plate is provided along the minimum circumscribed circle which contacts the outer surfaces of the plurality of heat exchange pipes. In the structure, by the guidance action of the circumscribed non-uniform-flow suppression plate, the combustion gas flows along the outer surfaces of the heat exchange pipes suitably. Thus, non-uniform flow and blow-through of the combustion gas are suppressed suitably, and the flow channel of the combustion gas can be made longer. Accordingly, the quantity of the heat received from the combustion gas by the oxygen-containing gas is increased, and improvement in the heat exchange efficiency is achieved suitably.

DESCRIPTION OF EMBODIMENTS

Figure 1:
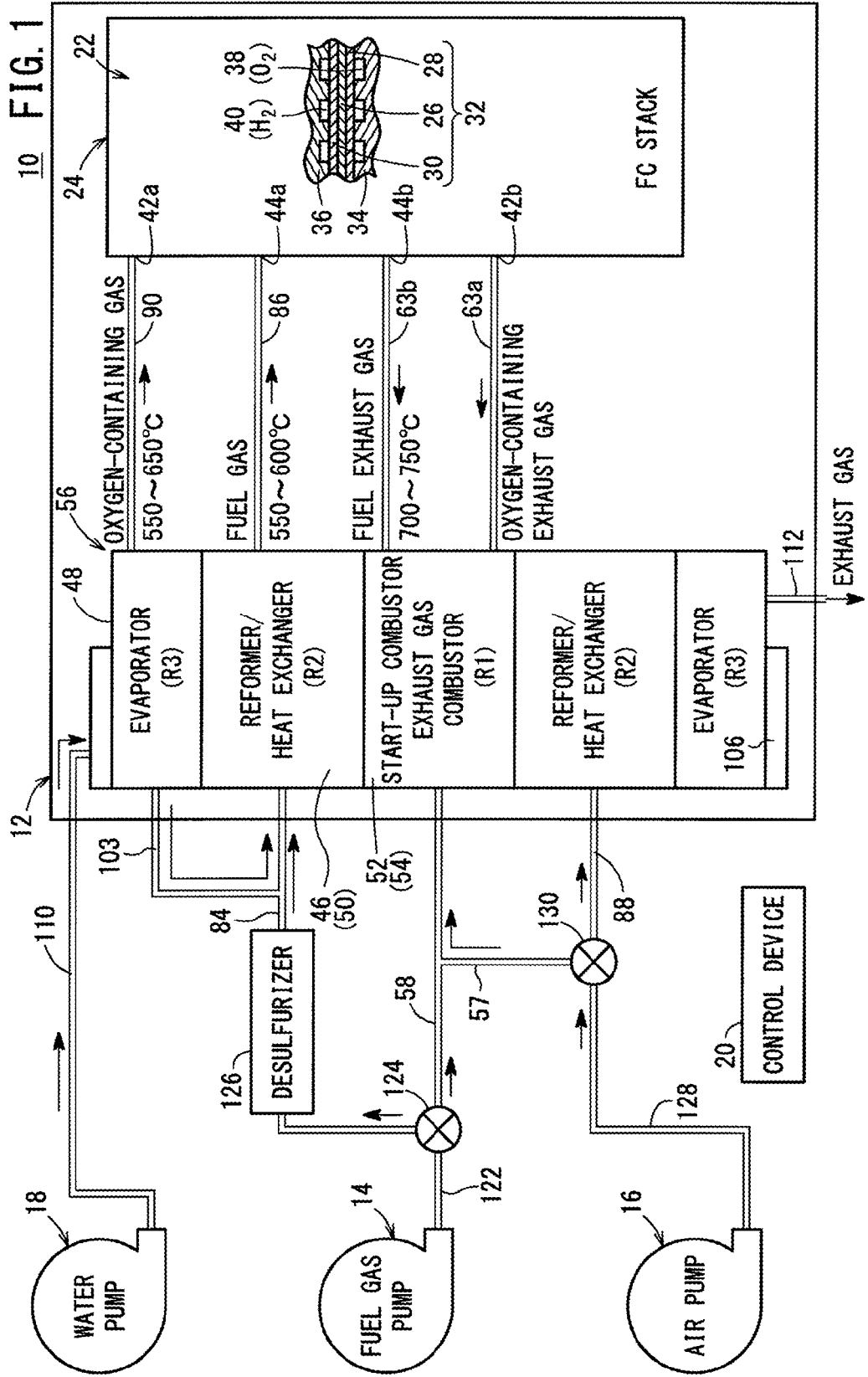
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a solid oxide fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 that faces the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of a raw fuel (e.g., city gas) chiefly containing hydrocarbon, and water vapor to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Figure 2:
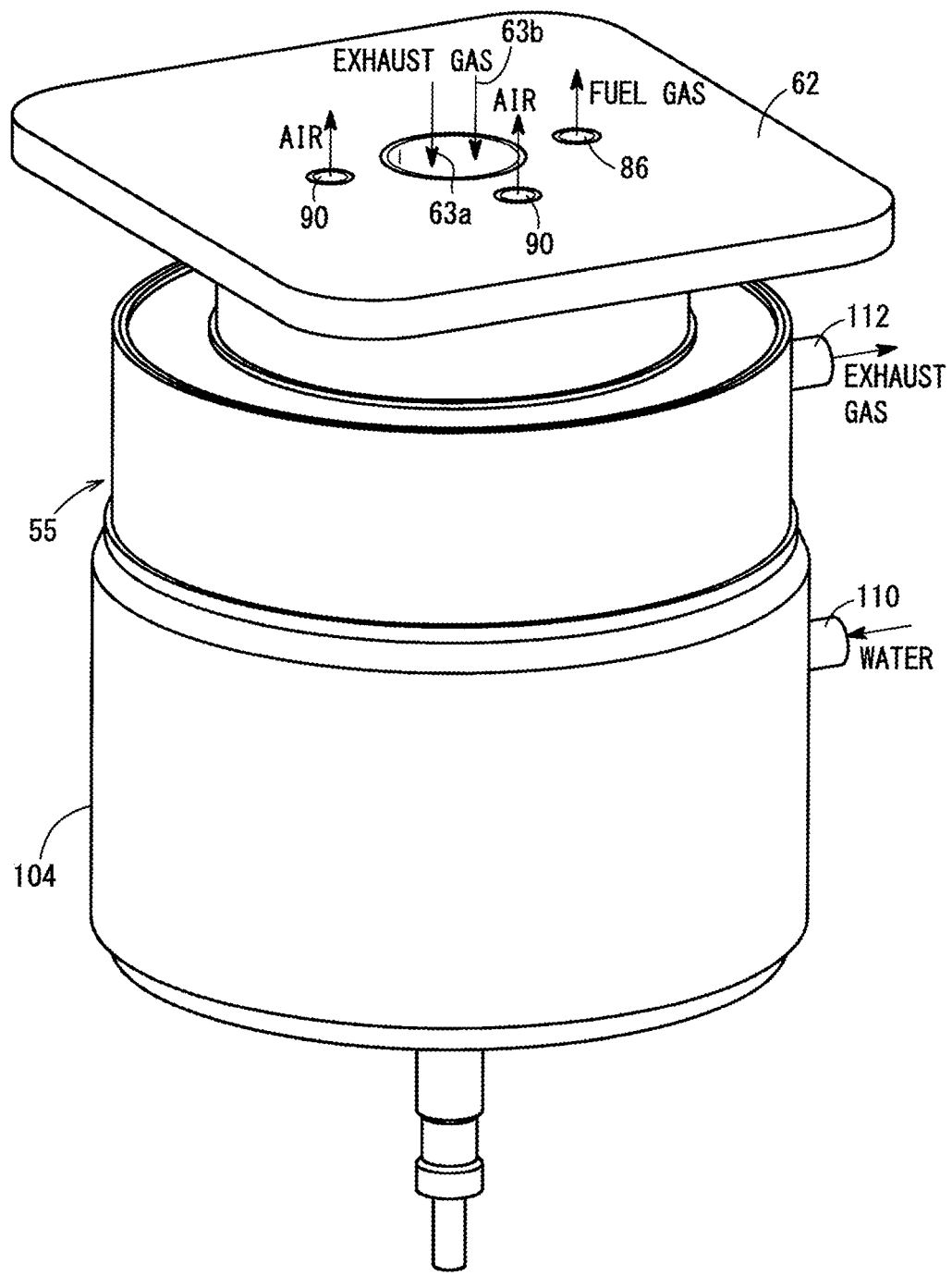
FIG. 2 is a perspective view showing FC peripheral equipment of the fuel cell module.

Basically, the fuel cell module 12 is made up of the fuel cell stack 24 and FC (fuel cell) peripheral equipment (BOP) 56 (see FIGS. 1 and 2). The FC peripheral equipment 56 includes the reformer 46, the evaporator 48, the heat exchanger 50, the exhaust gas combustor 52, and the start-up combustor 54.

Figure 3:
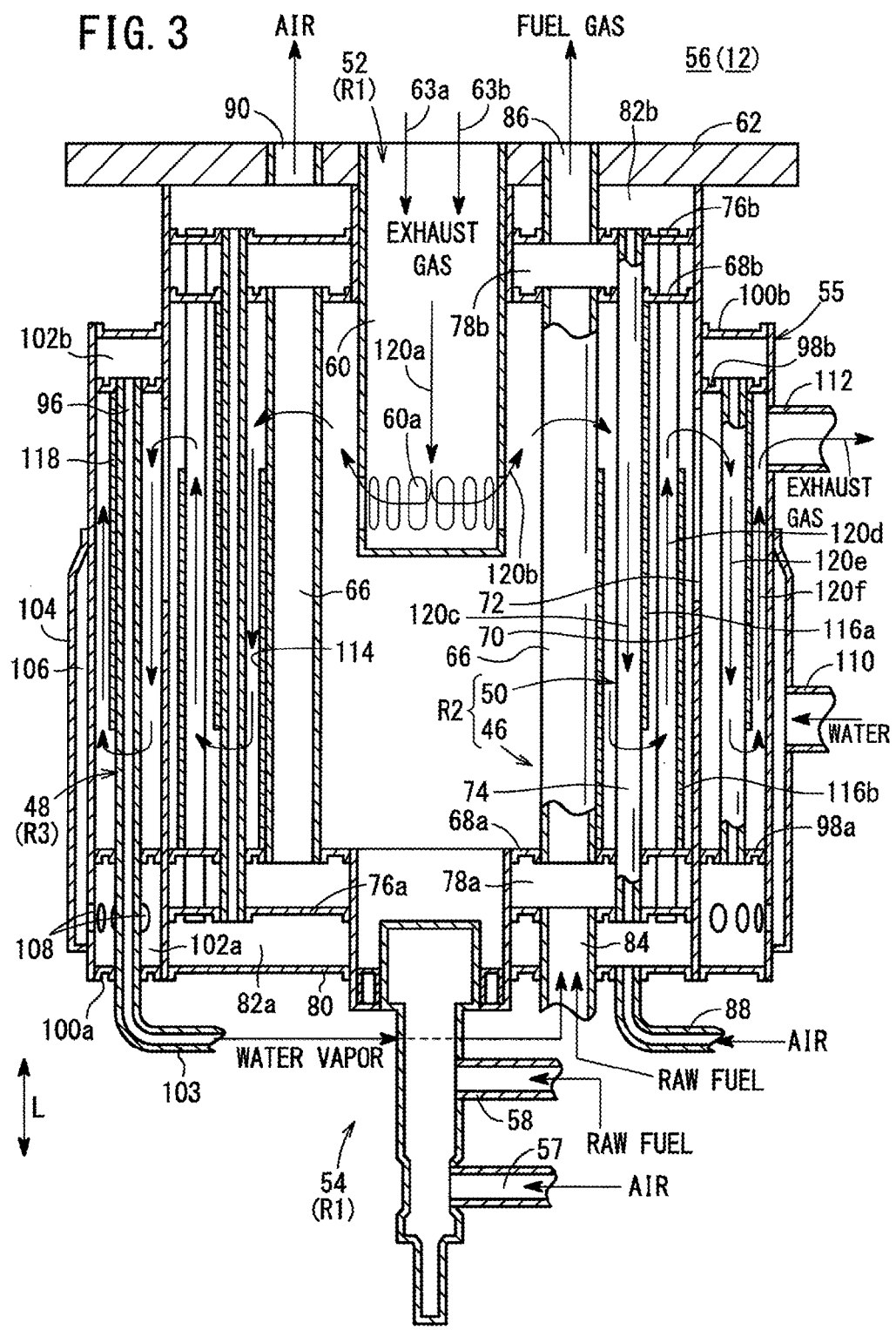
FIG. 3 is a cross sectional view showing the FC peripheral equipment.
Figure 4:
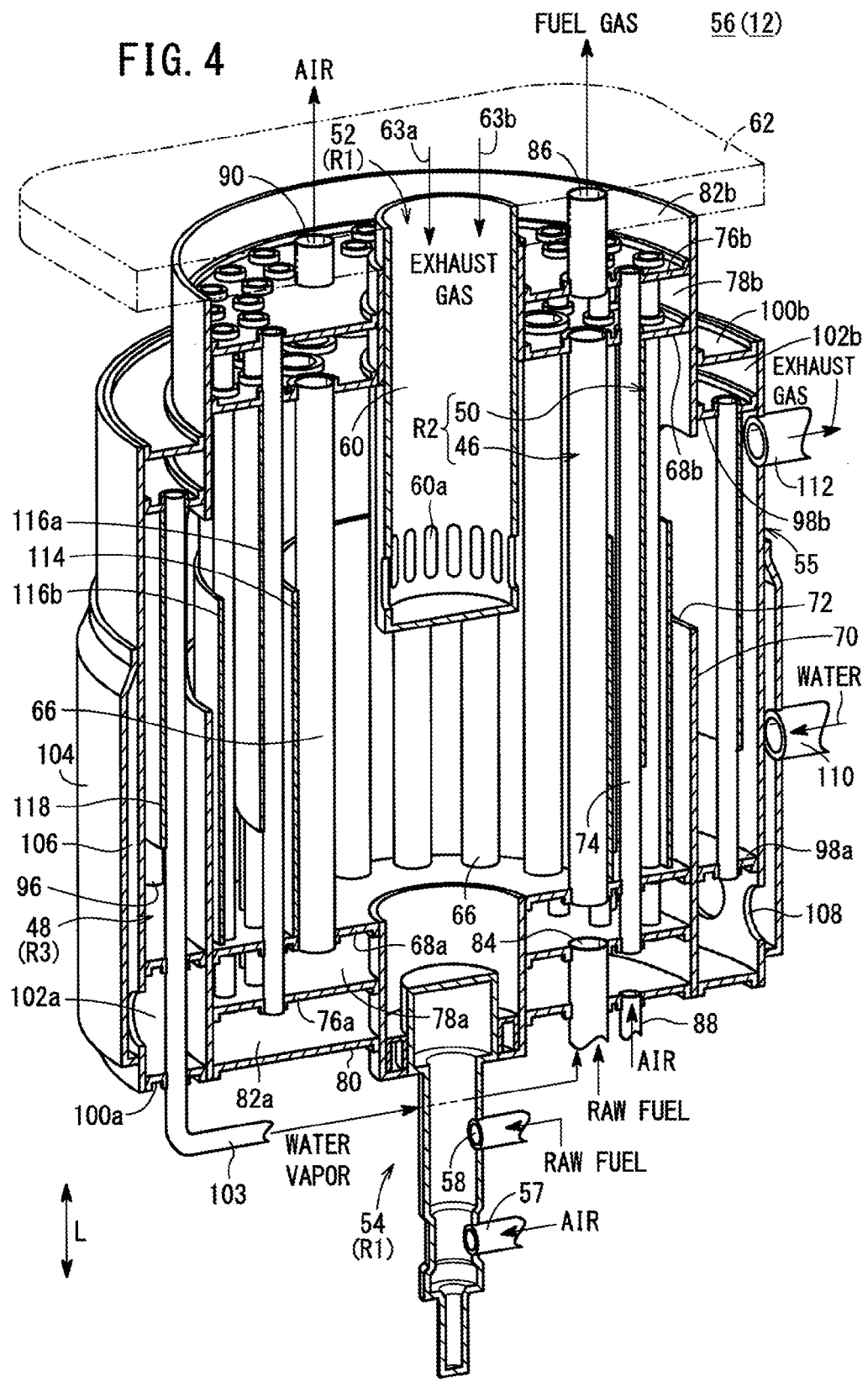
FIG. 4 is a perspective view with partial omission showing the FC peripheral equipment.
Figure 5:
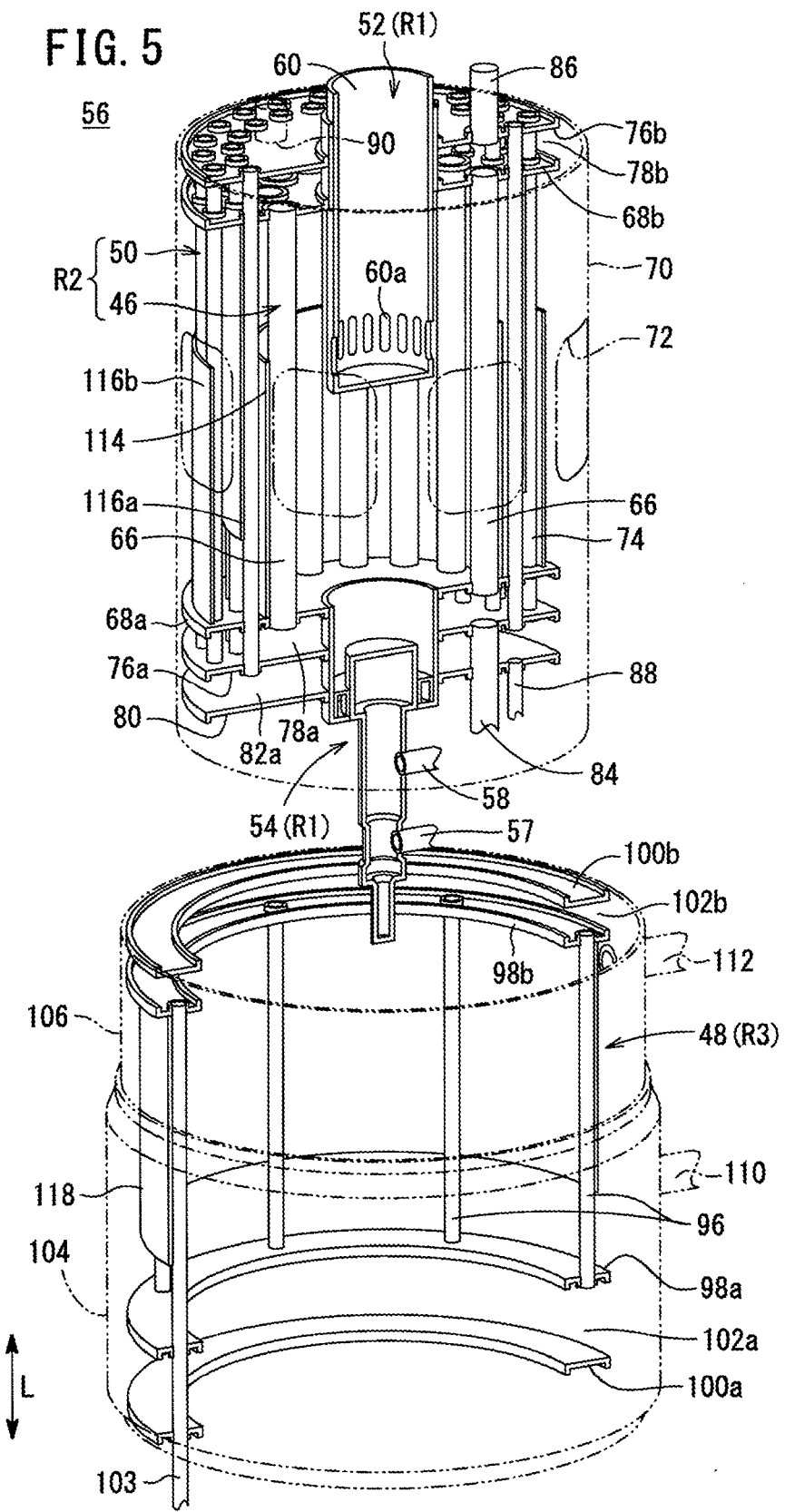
FIG. 5 is an exploded perspective view showing main components of the FC peripheral equipment.

As shown in FIGS. 3 to 5, the FC peripheral equipment 56 includes a first area R1 where the exhaust gas combustor 52 and the start-up combustor 54 are provided, an annular second area R2 formed around the first area R1 and where the reformer 46 and the heat exchanger 50 are provided, an annular third area R3 formed around the second area R2 and where the evaporator 48 is provided. A cylindrical outer member 55 of an outer wall is circumferentially provided outside the third area R3.

The start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57, thereby for sucking the raw fuel.

The exhaust gas combustor 52 is spaced away from the start-up combustor 54, and includes a combustion cup 60 formed in a shape of a cylinder having a bottom. A plurality of holes (e.g., circular holes or rectangular holes) 60a are formed along the outer circumference of an end portion of the combustion cup 60 on the bottom side. A stack attachment plate 62 is engaged with the other end portion of the combustion cup 60 on the bottomless side. The fuel cell stack 24 is attached to the stack attachment plate 62.

One end of an oxygen-containing exhaust gas channel 63a and one end of a fuel exhaust gas channel 63b are provided at the combustion cup 60. The combustion gas is produced inside the combustion cup 60 by combustion reaction of the fuel gas (specifically, fuel exhaust gas) and the oxygen-containing gas (specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 3 to 5, the reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is set at several hundred ° C.

The reformer 46 includes a plurality of reforming pipes (heat transmission pipes) 66 provided around the exhaust gas combustor 52 and the start-up combustor 54. Each of the reforming pipes 66 are filled with reforming catalyst pellets (not shown). Each reforming pipe 66 is fixed to a first lower ring member 68a at one end (lower end), and fixed to a first upper ring member 68b at the other end (upper end).

The outer circumferential portions of the first lower ring member 68a and the first upper ring member 68b are fixed to the inner circumferential portion of a cylindrical member 70 by welding or the like. The inner circumferential portions of the first lower ring member 68a and the first upper ring member 68b are fixed to the outer circumferential portion of the exhaust gas combustor 52 and the start-up combustor 54 by welding or the like. The cylindrical member 70 extends in an axial direction indicated by an arrow L, and an end of the cylindrical member 70 adjacent to the fuel cell stack 24 is fixed to the stack attachment plate 62. A plurality of openings 72 are formed in the outer circumference of the cylindrical member 70 in a circumferential direction at predetermined height positions.

Figure 6:
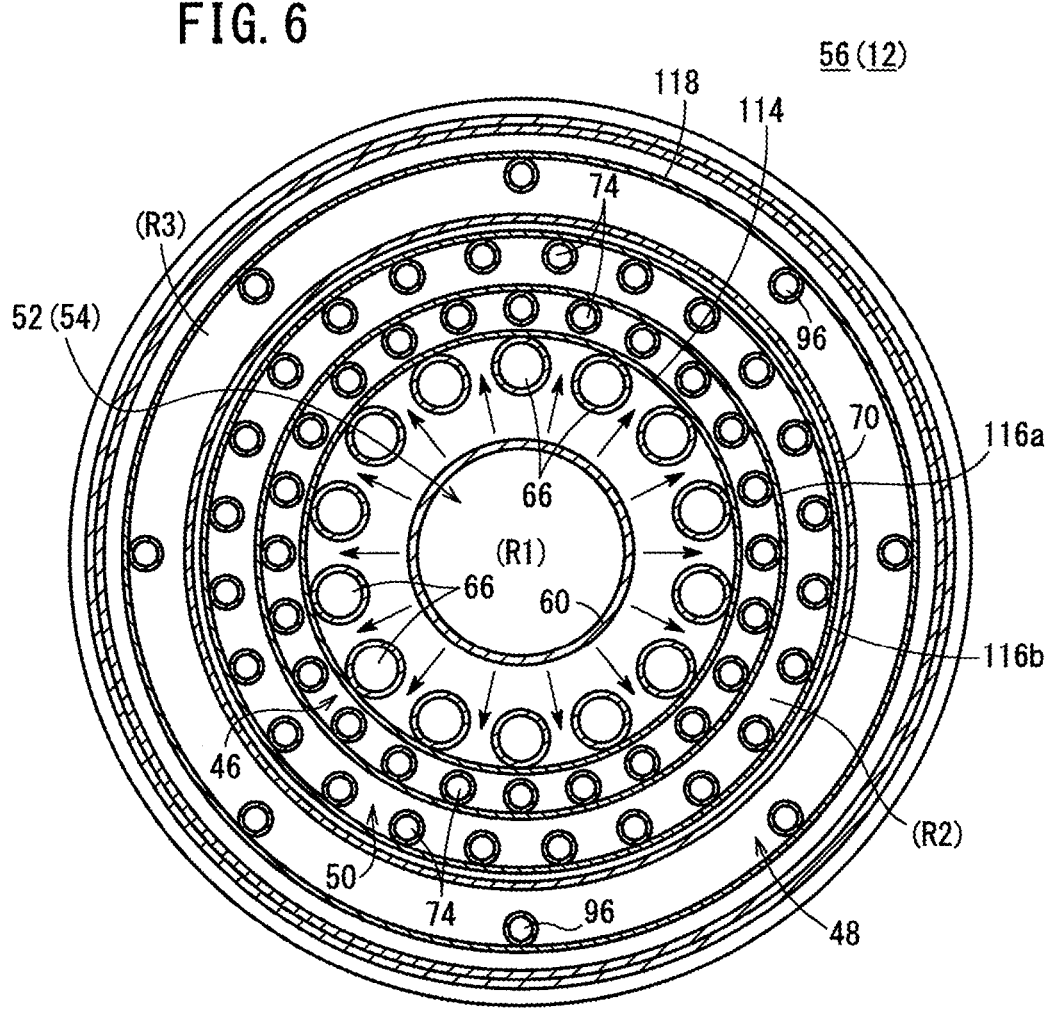
FIG. 6 is a cross sectional plan view showing the FC peripheral equipment.

The heat exchanger 50 has heat exchange pipes (heat transmission pipes) 74 provided adjacent to the reforming pipes 66 of the reformer 46 and arranged radially outwardly with respect to a circular array of the reforming pipes 66 (outside the circular array). As shown in FIG. 6, the reforming pipes 66 are arranged at equal intervals on a virtual circle concentrically around the first area R1. The heat exchange pipes 74 are arranged at equal intervals on two inner and outer virtual circles outside the circular array of the reforming pipes 66, concentrically around the first area R1. The heat exchange pipes 74 arranged along the inner virtual circle and the heat exchange pipes 74 arranged along the outer virtual circle are offset from each other (in a staggered pattern).

As shown in FIGS. 3 and 4, each of the heat exchange pipes 74 is fixed to a second lower ring member 76a at one end (lower end) by welding or the like, and each of the heat exchange pipes 74 is fixed to a second upper ring member 76b at the other end (upper end) by welding or the like. The outer circumferential portions of the second lower ring member 76a and the second upper ring member 76b are fixed to the inner circumferential portion of the cylindrical member 70 by welding or the like. The inner circumferential portions of the second lower ring member 76a and the second upper ring member 76b are fixed to the outer circumferential portions of the exhaust gas combustor 52 and the start-up combustor 54 by welding or the like.

The second lower ring member 76a is positioned below the first lower ring member 68a (outside the first lower ring member 68a in the axial direction), and the second upper ring member 76b is positioned above the first upper ring member 68b (outside the first upper ring member 68b in the axial direction).

An annular mixed gas supply chamber 78a is formed between the first lower ring member 68a and the second lower ring member 76a, and a mixed gas of raw fuel and water vapor is supplied to the mixed gas supply chamber 78a. Further, an annular fuel gas discharge chamber 78b is formed between the first upper ring member 68b and the second upper ring member 76b, and the produced fuel gas (reformed gas) is discharged to the fuel gas discharge chamber 78b. Both ends of each of the reforming pipes 66 are opened to the mixed gas supply chamber 78a and the fuel gas discharge chamber 78b.

A ring shaped end ring member 80 is fixed to an end of the cylindrical member 70 adjacent to the start-up combustor 54 by welding or the like. An annular oxygen-containing gas supply chamber 82a is formed between the end ring member 80 and the second lower ring member 76a, and the oxygen-containing gas is supplied to the oxygen-containing gas supply chamber 82a. An annular oxygen-containing gas discharge chamber 82b is formed between the second upper ring member 76b and the stack attachment plate 62, and the heated oxygen-containing gas is discharged to the oxygen-containing gas discharge chamber 82b. Both ends of each of the heat exchange pipes 74 are opened to the oxygen-containing gas supply chamber 82a and the oxygen-containing gas discharge chamber 82b.

The fuel gas discharge chamber 78b and the oxygen-containing gas discharge chamber 82b are provided in double-deck manner, and the fuel gas discharge chamber 78b is provided inside (below) the oxygen-containing gas discharge chamber 82b in the axial direction. The mixed gas supply chamber 78a and the oxygen-containing gas supply chamber 82a are provided in a double-deck manner, and the mixed gas supply chamber 78a is provided inside (above) the oxygen-containing gas supply chamber 82a in the axial direction.

A raw fuel supply channel 84 is opened to the mixed gas supply chamber 78a, and an evaporation return pipe 103 described later is connected to a position in the middle of the raw fuel supply channel 84 (see FIG. 1). The raw fuel supply channel 84 has an ejector function, and generates negative pressure by the flow of the raw fuel, thereby for sucking the water vapor.

The raw fuel supply channel 84 is fixed to the second lower ring member 76a and the end ring member 80 by welding or the like. One end of a fuel gas channel 86 is connected to the fuel gas discharge chamber 78b, and the other end of the fuel gas channel 86 is connected to the fuel gas supply passage 44a of the fuel cell stack 24 (see FIG. 1). The fuel gas channel 86 is fixed to the second upper ring member 76b by welding or the like, and extends through the stack attachment plate 62 (see FIG. 2).

An oxygen-containing gas supply pipe 88 is connected to the oxygen-containing gas supply chamber 82a. The oxygen-containing gas supply pipe 88 is fixed to the end ring member 80 by welding or the like. One end of each of two oxygen-containing gas pipes 90 is provided in the oxygen-containing gas discharge chamber 82b, and the other end of each of the two oxygen-containing gas pipes 90 extends through the stack attachment plate 62, and is connected to the oxygen-containing gas supply passage 42a of the fuel cell stack 24 (see FIG. 1).

As shown in FIGS. 3 and 4, the evaporator 48 has a plurality of evaporation pipes (heat transmission pipes) 96 provided along, and around the outer circumference of the cylindrical member 70. Each of the evaporation pipes 96 is fixed to a lower ring member 98a at one end (lower end), and fixed to an upper ring member 98b at the other end (upper end).

A lower end ring member 100a is provided below the lower ring member 98a, and an upper end ring member 100b is provided above the upper ring member 98b. The lower end ring member 100a and the upper end ring member 100b are fixed to the outer circumference of the cylindrical member 70 and the inner circumference of the outer member 55 by welding or the like.

An annular water supply chamber 102a is formed between the lower ring member 98a and the lower end ring member 100a, and water is supplied to the water supply chamber 102a. An annular water vapor discharge chamber 102b is formed between the upper ring member 98b and the upper end ring member 100b, and water vapor is discharged to the water vapor discharge chamber 102b. Both ends of each of the evaporation pipes 96 are fixed to the lower ring member 98a and the upper ring member 98b by welding or the like, and opened to the water supply chamber 102a and the water vapor discharge chamber 102b.

The mixed gas supply chamber 78a and the oxygen-containing gas supply chamber 82a are placed inside the inner circumferential portion of the water supply chamber 102a. The water vapor discharge chamber 102b is provided outside the fuel gas discharge chamber 78b at a position offset downward from the fuel gas discharge chamber 78b in the axial direction (downward in the pipe length direction). One end of the evaporation return pipe 103 including at least one of the evaporation pipes 96 is provided in the water vapor discharge chamber 102b, and the other end of the evaporation return pipe 103 is connected to a position in the middle of the raw fuel supply channel 84 (see FIG. 1).

A cylindrical cover member 104 is fixed to the outer circumferential portion of the outer member 55. The center of the cylindrical cover member 104 is offset to a lower position. Both of upper and lower ends (both of axial ends) of the cover member 104 are welded to the outer member 55, and a heat recovery area (chamber) 106 is formed between the cover member 104 and the outer circumferential portion of the outer member 55.

A plurality of holes 108 are formed circumferentially in a lower end portion of the outer member 55 of the water supply chamber 102a, and the water supply chamber 102a is connected to the heat recovery area 106 through the holes 108. A water supply pipe 110 communicating with the heat recovery area 106 is connected to the cover member 104. An exhaust gas pipe 112 communicating with the third area R3 is connected to an upper portion of the outer member 55.

In the first embodiment, as shown in FIGS. 3 to 5, a first circumscribed non-uniform-flow suppression plate 114 is provided in the second area R2 where the reformer 46 and the heat exchanger 50 are provided. The first circumscribed non-uniform-flow suppression plate 114 is provided along the minimum circumscribed circle which contacts the outer surfaces of the plurality of reforming pipes 66 of the reformer 46. For example, the first circumscribed non-uniform-flow suppression plate 114 has a cylindrical shape made of a thin metal plate. For example, the circumscribed non-uniform-flow suppression plate 114 is fixed to the first lower ring member 68a by welding or the like. The upper end of the first circumscribed non-uniform-flow suppression plate 114 is positioned above the holes 60a of the combustion cup 60.

Second circumscribed non-uniform-flow suppression plates 116a, 116b are provided in the second area R2. The second circumscribed non-uniform-flow suppression plates 116a, 116b are provided along the minimum circumscribed circles which contact the outer surfaces of the plurality of heat exchange pipes 74 of the heat exchanger 50 arranged along the respective virtual circles. The second circumscribed non-uniform-flow suppression plate 116a has a cylindrical shape, and contacts the outer surfaces of the plurality of heat exchange pipes 74 on the inner side. The second circumscribed non-uniform-flow suppression plate 116a is fixed to the first upper ring member 68b. The lower end of the second circumscribed non-uniform-flow suppression plate 116a is spaced upward from the first lower ring member 68a.

The second circumscribed non-uniform-flow suppression plate 116b has a cylindrical shape, and contacts the outer surfaces of the plurality of heat exchange pipes 74 on the outer side. The second circumscribed non-uniform-flow suppression plate 116b is fixed to the first lower ring member 68a. The upper end of the second circumscribed non-uniform-flow suppression plate 116b is spaced downward from the first upper ring member 68b.

A third circumscribed non-uniform-flow suppression plate 118 is provided in the third area R3 where the evaporator 48 is provided. The third circumscribed non-uniform-flow suppression plate 118 has a cylindrical shape. The third circumscribed non-uniform-flow suppression plate 118 is provided along the minimum circumscribed circle which contacts the outer surfaces of the plurality of evaporation pipes 96 of the evaporator 48. The third circumscribed non-uniform-flow suppression plate 118 is fixed to the upper ring member 98b. The lower end of the third circumscribed non-uniform-flow suppression plate 118 is spaced upward from the lower ring member 98a.

Figure 7:
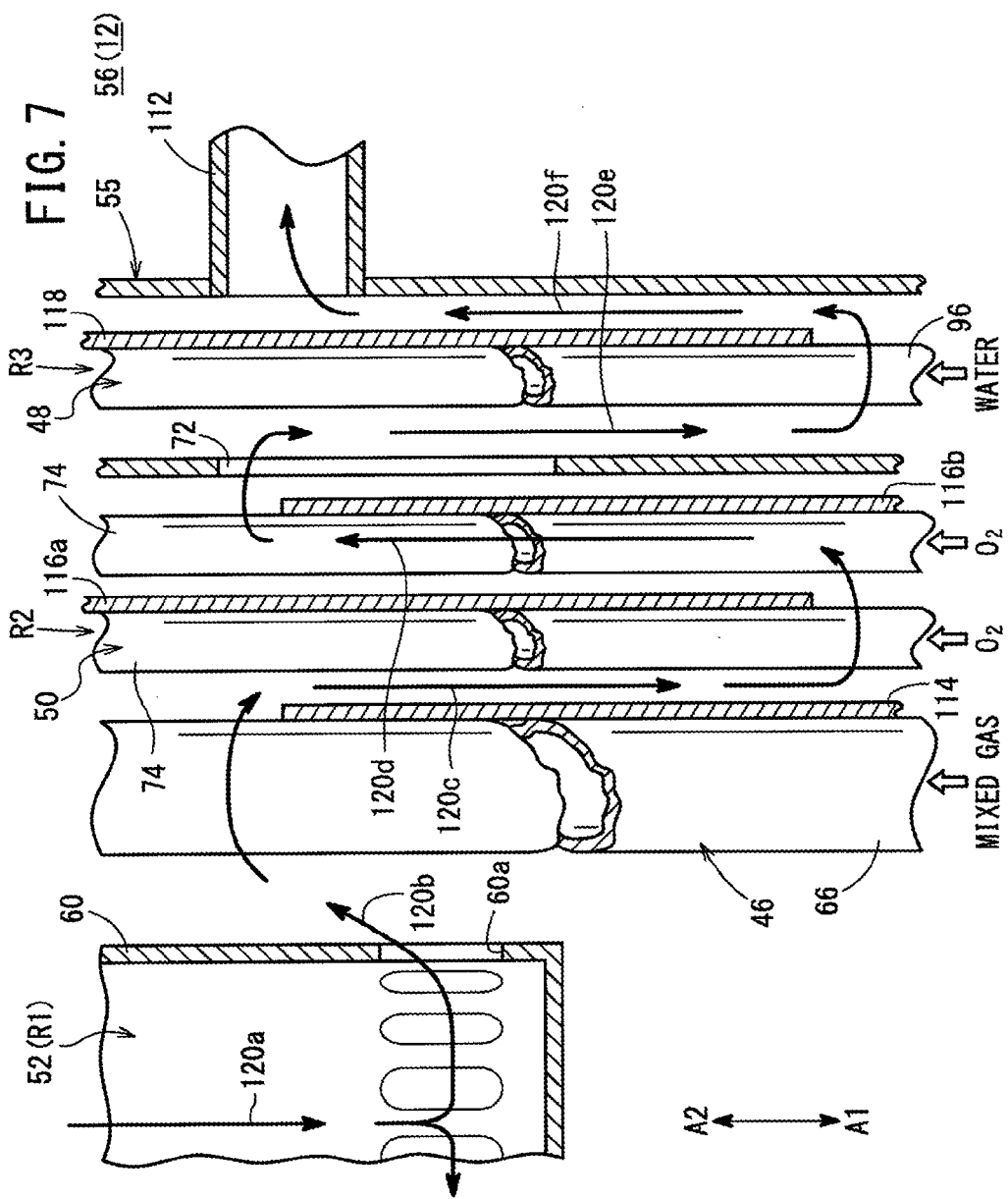
FIG. 7 is a view showing flows of a combustion gas in the FC peripheral equipment.

As schematically shown in FIG. 7, a first combustion gas channel 120a is formed in the first area R1. The combustion gas flows through the first combustion gas channel 120a in a direction indicated by an arrow A1. A second combustion gas channel 120b is formed in the second area R2. The combustion gas which has passed through the holes 60a of the combustion cup 60 flows through the second combustion gas channel 120b. A third combustion gas channel 120c and a fourth combustion gas channel 120d are formed in the second area R2. The combustion gas flows through the third combustion gas channel 120c, between the first circumscribed non-uniform-flow suppression plate 114 and the second circumscribed non-uniform-flow suppression plate 116a in the direction indicated by the arrow A1. The combustion gas flows through the fourth combustion gas channel 120d between the second circumscribed non-uniform-flow suppression plate 116a and the second circumscribed non-uniform-flow suppression plate 116b in a direction indicated by an arrow A2.

A fifth combustion gas channel 120e is formed in the third area R3. The combustion gas which has passed through a plurality of openings 72 flows through the fifth combustion gas channel 120e along the third circumscribed non-uniform-flow suppression plate 118 in the direction indicated by the arrow A1. A sixth combustion gas channel 120f is formed on the outer circumferential side of the third circumscribed non-uniform-flow suppression plate 118. The combustion gas flows through the sixth combustion gas channel 120f in the direction indicated by the arrow A2, and the combustion gas is discharged into the exhaust gas pipe 112.

As shown in FIG. 1, the raw fuel supply apparatus 14 includes a raw fuel channel 122. The raw fuel channel 122 is branched into the raw fuel supply channel 84 and the raw fuel supply pipe 58 through a raw fuel control valve 124. A desulfurizer 126 for removing sulfur compounds in the city gas (raw fuel) is provided in the raw fuel supply channel 84.

The oxygen-containing gas supply apparatus 16 includes an oxygen-containing gas channel 128. The oxygen-containing gas channel 128 is branched into the oxygen-containing gas supply pipe 88 and the air supply pipe 57 through an oxygen-containing gas control valve 130. The water supply apparatus 18 is connected to the evaporator 48 through the water supply pipe 110.

Operation of the fuel cell system 10 will be described below.

At the time of starting operation of the fuel cell system 10, the air (oxygen-containing gas) and the raw fuel are supplied to the start-up combustor 54. Specifically, in the oxygen-containing gas supply apparatus 16, by operation of the air pump, the air is supplied to the oxygen-containing gas channel 128. By adjusting the opening degree of the oxygen-containing gas control valve 130, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 122. By adjusting the opening degree of the raw fuel control valve 124, the raw fuel is supplied into the raw fuel supply pipe 58. The raw fuel is mixed with the air, and supplied into the start-up combustor 54 (see FIGS. 3 and 4).

Thus, the mixed gas of the raw fuel and the air is supplied into the start-up combustor 54, and the mixed gas is ignited to start combustion. Therefore, the combustion gas produced in combustion flows from the first area R1 to the second area R2. Further, the combustion gas is supplied to the third area R3, and then, the combustion gas is discharged to the outside of the fuel cell module 12 through the exhaust gas pipe 112.

As shown in FIGS. 3 and 4, the reformer 46 and the heat exchanger 50 are provided in the second area R2, and the evaporator 48 is provided in the third area R3. Thus, the combustion gas discharged from the first area R1 first heats the reformer 46, next heats the heat exchanger 50, and then heats the evaporator 48.

Then, after the temperature of the fuel cell module 12 is raised to a predetermined temperature, the air (oxygen-containing gas) is supplied to the heat exchanger 50, and the mixed gas of the raw fuel and the water vapor is supplied to the reformer 46.

Specifically, as shown in FIG. 1, the opening degree of the oxygen-containing gas control valve 130 is adjusted such that the flow rate of the air supplied to the oxygen-containing gas supply pipe 88 is increased, and the opening degree of the raw fuel control valve 124 is adjusted such that the flow rate of the raw fuel supplied to the raw fuel supply channel 84 is increased. Further, by operation of the water supply apparatus 18, the water is supplied to the water supply pipe 110. The air flows from the oxygen-containing gas supply pipe 88 into the oxygen-containing gas supply chamber 82a.

Therefore, as shown in FIGS. 3 and 4, the air flows into the heat exchanger 50, and after the air is temporarily supplied to the oxygen-containing gas supply chamber 82a, while the air is moving inside the heat exchange pipes 74, the air is heated by heat exchange with the combustion gas supplied into the second area R2. After the heated air is temporarily supplied to the oxygen-containing gas discharge chamber 82b, the air is supplied to the oxygen-containing gas supply passage 42a of the fuel cell stack 24 through the oxygen-containing gas pipe 90 (see FIG. 1). In the fuel cell stack 24, the heated air flows along the oxygen-containing gas flow field 38, and the air is supplied to the cathode 28.

After the air flows through the oxygen-containing gas flow field 38, the air is discharged from the oxygen-containing gas discharge passage 42b into the oxygen-containing exhaust gas channel 63a. The oxygen-containing exhaust gas channel 63a is opened to the combustion cup 60 of the exhaust gas combustor 52, and the oxygen-containing exhaust gas is supplied into the combustion cup 60.

Further, as shown in FIG. 1, the water from the water supply apparatus 18 is supplied to the evaporator 48. After the raw fuel is desulfurized at the desulfurizer 126, the raw fuel flows through the raw fuel supply channel 84, and moves toward the reformer 46.

In the evaporator 48, as shown in FIG. 3, the water is supplied from the water supply pipe 110 to the heat recovery area 106 of the outer member 55. Therefore, after the water is temporarily supplied to the water supply chamber 102a through the holes 108, while water is moving inside the evaporation pipes 96, the water is heated by the combustion gas flowing through the third area R3, and then vaporized.

After the water vapor flows into the water vapor discharge chamber 102b temporarily, the water vapor is supplied to the evaporation return pipe 103 connected to the water vapor discharge chamber 102b. Thus, the water vapor flows inside the evaporation return pipe 103, and flows into the raw fuel supply channel 84. Then, the water vapor is mixed with the raw fuel supplied by the raw fuel supply apparatus 14 to produce the mixed gas.

The mixed gas from the raw fuel supply channel 84 is temporarily supplied to the mixed gas supply chamber 78a of the reformer 46. The mixed gas moves inside the reforming pipes 66. In the meanwhile, the mixed gas is heated by the combustion gas flowing through the second area R2, and steam reforming is performed. After removal (reforming) of hydrocarbon of $C_{2+}$, a reformed gas chiefly containing methane is obtained.

This reformed gas is temporarily supplied as the heated fuel gas to the fuel gas discharge chamber 78b. Thereafter, the fuel gas is supplied to the fuel gas supply passage 44a of the fuel cell stack 24 through the fuel gas channel 86 (see FIG. 1). In the fuel cell stack 24, the heated fuel gas flows along the fuel gas flow field 40, and the fuel gas is supplied to the anode 30, while the air is supplied to the cathode 28, thereby for generating electricity in the electrolyte electrode assembly 32.

After the fuel gas flows through the fuel gas flow field 40, the fuel gas is discharged from the fuel gas discharge passage 44b to the fuel exhaust gas channel 63b. The fuel exhaust gas channel 63b is opened to the inside of the combustion cup 60 of the exhaust gas combustor 52, and the fuel exhaust gas is supplied into the combustion cup 60.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the combustion cup 60. In the meanwhile, combustion operation by the start-up combustor 54 is stopped.

The combustion cup 60 has the holes 60a. Therefore, as shown in FIG. 3, the combustion gas supplied into the combustion cup 60 flows through the holes 60a from the first area R1 into the second area R2. Then, after the combustion gas is supplied to the third area R3, the combustion gas is discharged to the outside of the fuel cell module 12.

In the first embodiment, as shown in FIGS. 3 and 4, the FC peripheral equipment 56 includes the first area R1 where the exhaust gas combustor 52 and the start-up combustor 54 are provided, the annular second area R2 around the first area R1 and where the reformer 46 and the heat exchanger 50 are provided, and the annular third area R3 around the second area R2 and where the evaporator 48 is provided.

That is, the first area R1 is provided at the center, the annular second area R2 is provided around the first area R1, and the annular third area R3 is provided around the second area R2. In the structure, generation of waste heat and heat radiation can be suppressed suitably. Thus, improvement in the heat efficiency is achieved, thermally self-sustaining operation is facilitated, and simple and compact structure of the fuel cell module 12 is achieved as a whole. Thermally self-sustaining operation herein means operation where the operating temperature of the fuel cell 22 is maintained using only heat energy generated in the fuel cell 22, without supplying additional heat from the outside.

Further, in the first embodiment, as shown in FIG. 3, the heat exchanger 50 includes the annular oxygen-containing gas supply chamber 82a, the annular oxygen-containing gas discharge chamber 82b, and the heat exchange pipes 74. The oxygen-containing gas is supplied to the oxygen-containing gas supply chamber 82a, and the heated oxygen-containing gas is discharged into the oxygen-containing gas discharge chamber 82b. The heat exchange pipes 74 are connected to the oxygen-containing gas supply chamber 82a at one end, and connected to the oxygen-containing gas discharge chamber 82b at the other end.

Further, as shown in FIGS. 3 and 7, the third combustion gas channel 120c is formed between the first circumscribed non-uniform-flow suppression plate 114 and the second circumscribed non-uniform-flow suppression plate 116a, and the combustion gas flows through the third combustion gas channel 120c in the direction indicated by the arrow A1. The fourth combustion gas channel 120d is formed between the second circumscribed non-uniform-flow suppression plate 116a and the second circumscribed non-uniform-flow suppression plate 116b. The combustion gas flows through the fourth combustion gas channel 120d in the direction indicated by the arrow A2.

Thus, in the heat exchanger 50, simple structure is achieved easily, and the production cost is reduced effectively. Further, by changing the volumes of the oxygen-containing gas supply chamber 82a and the oxygen-containing gas discharge chamber 82b, the length, the diameter, and the number of the pipes, the desired operation can be achieved depending on various operating conditions, and a wider variety of designs become available.

Further, in the first embodiment, the second circumscribed non-uniform-flow suppression plates 116a, 116b are provided on the minimum circumscribed circles which contact the outer surfaces of the plurality of heat exchange pipes 74. In the structure, by the guidance action of the second circumscribed non-uniform-flow suppression plates 116a, 116b, the combustion gas flows along the outer surfaces of the heat exchange pipes 74 suitably. Thus, non-uniform flow and blow-through of the combustion gas are prevented suitably, and the flow channel of the combustion gas can be lengthened. Accordingly, the quantity of the heat received from the combustion gas by the oxygen-containing gas is increased, and improvement in the heat exchange efficiency is achieved suitably.

Furthermore, as shown in FIG. 3, the reformer 46 includes the annular mixed gas supply chamber 78a, the annular fuel gas discharge chamber 78b, and the reforming pipes 66. The mixed gas is supplied to the mixed gas supply chamber 78a, and the produced fuel gas is discharged into the fuel gas discharge chamber 78b. Each of the reforming pipes 66 is connected to the mixed gas supply chamber 78a at one end, and connected to the fuel gas discharge chamber 78b at the other end. Further, the second combustion gas channel 120b for supplying the combustion gas is provided between the reforming pipes 66, and the first circumscribed non-uniform-flow suppression plate 114 is provided along the minimum circumscribed circle which contacts the outer surfaces of the reforming pipes 66.

Thus, simple structure is achieved easily, and the production cost is reduced effectively. Further, by changing the volumes of the mixed gas supply chamber 78a and the fuel gas discharge chamber 78b, the length, the diameter, and the number of the pipes, the desired operation can be achieved depending on various operating conditions, and a wider variety of designs become available.

Further, by the guidance action of the first circumscribed non-uniform-flow suppression plate 114, the combustion gas flows along the outer surfaces of the reforming pipes 66 suitably. Thus, non-uniform flow and blow-through of the combustion gas are suppressed suitably, and the flow channel of the combustion gas can be lengthened. Accordingly, the mixed gas receives more heat energy from the combustion gas, and improvement in the heat exchange efficiency is achieved suitably.

Furthermore, the evaporator 48 includes the annular water supply chamber 102a, the annular water vapor discharge chamber 102b, and the evaporation pipes 96. The water is supplied to the water supply chamber 102a, and the water vapor is discharged into the water vapor discharge chamber 102b. The evaporation pipes 96 are each connected to the water supply chamber 102a at one end, and connected to the water vapor discharge chamber 102b at the other end. The fifth combustion gas channel 120e for supplying the combustion gas is provided between the evaporation pipes 96, and the third circumscribed non-uniform-flow suppression plate 118 is provided along the minimum circumscribed circle which contacts the outer surfaces of the evaporation pipes 96.

Thus, simple structure is achieved easily, and the production cost is reduced effectively. Further, by changing the volumes of the water supply chamber 102a and the water vapor discharge chamber 102b, the length, the diameter, and the number of the pipes, the desired operation can be achieved depending on various operating conditions, and a wider variety of designs become available.

Further, by the guidance action of the third circumscribed non-uniform-flow suppression plate 118, the combustion gas flows along the outer surfaces of the evaporation pipes 96 suitably. Thus, non-uniform flow and blow-through of the combustion gas are suppressed suitably, and the flow channel of the combustion gas can be lengthened. Accordingly, the water receives more heat energy from the combustion gas, and improvement in the heat exchange efficiency is achieved suitably.

Further, the fuel cell module 12 is a solid oxide fuel cell module. Therefore, the fuel cell module 12 is optimally applicable to high temperature type fuel cells such as SOFC.

Figure 8:
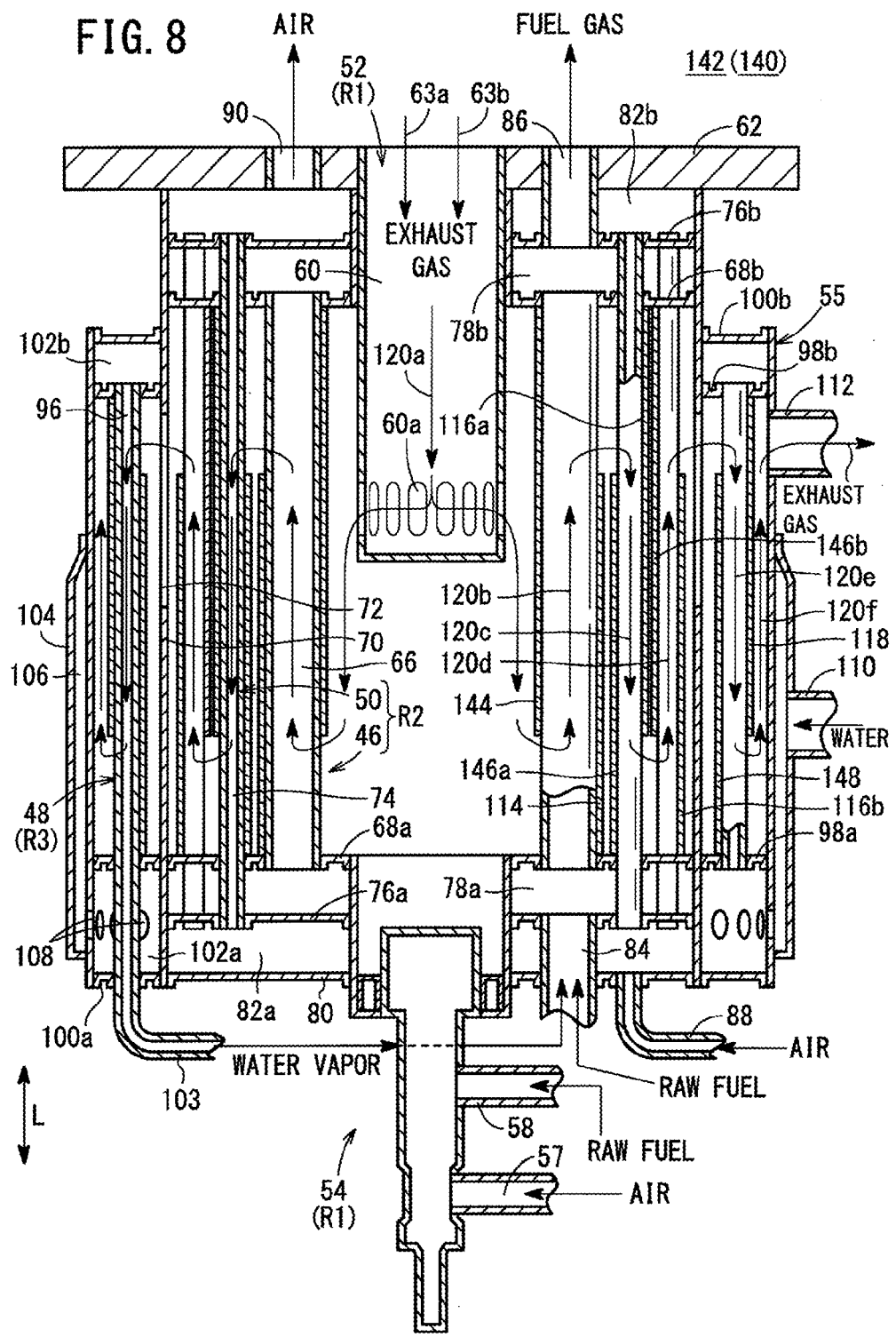
FIG. 8 is a cross sectional view showing FC peripheral equipment of a fuel cell module according to a second embodiment of the present invention.
Figure 9:
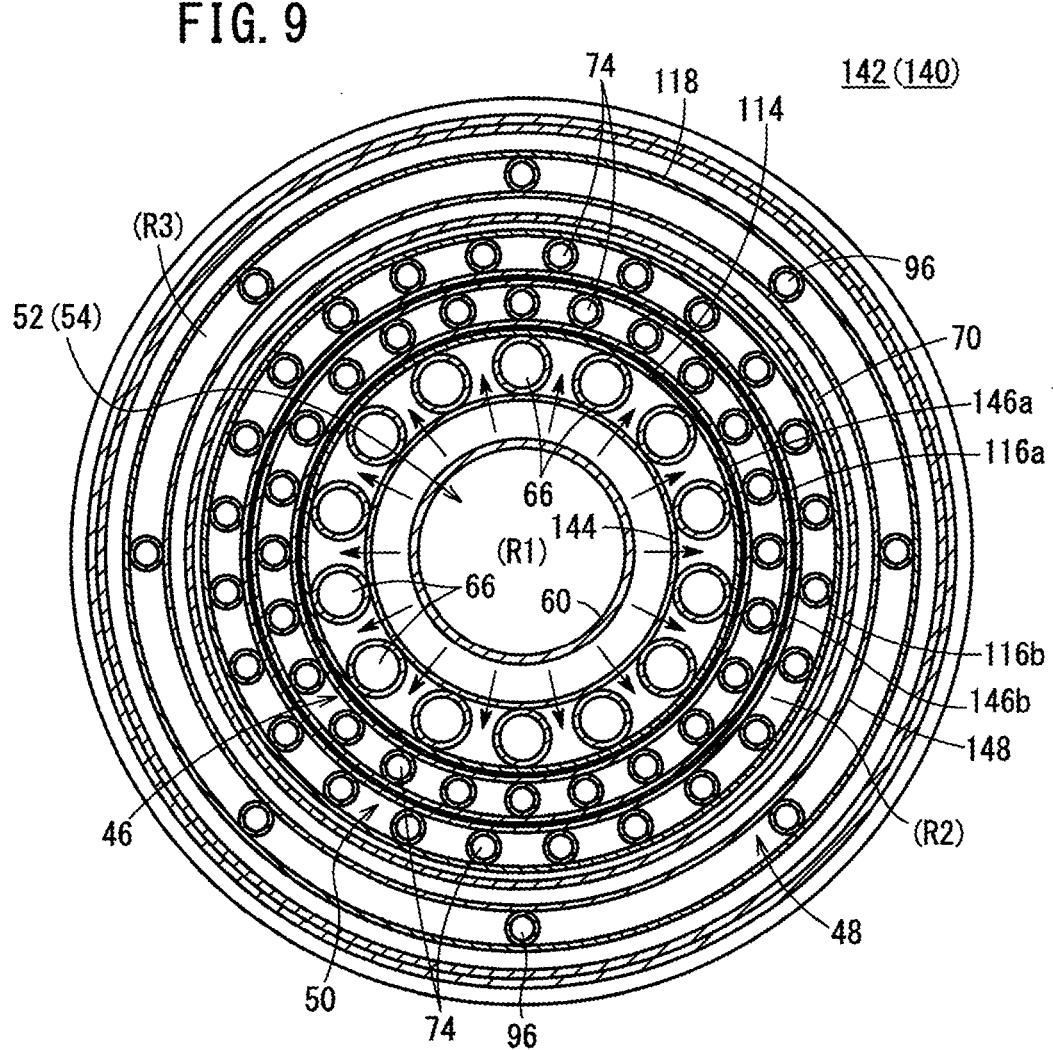
FIG. 9 is a cross sectional plan view showing the FC peripheral equipment.
Figure 10:
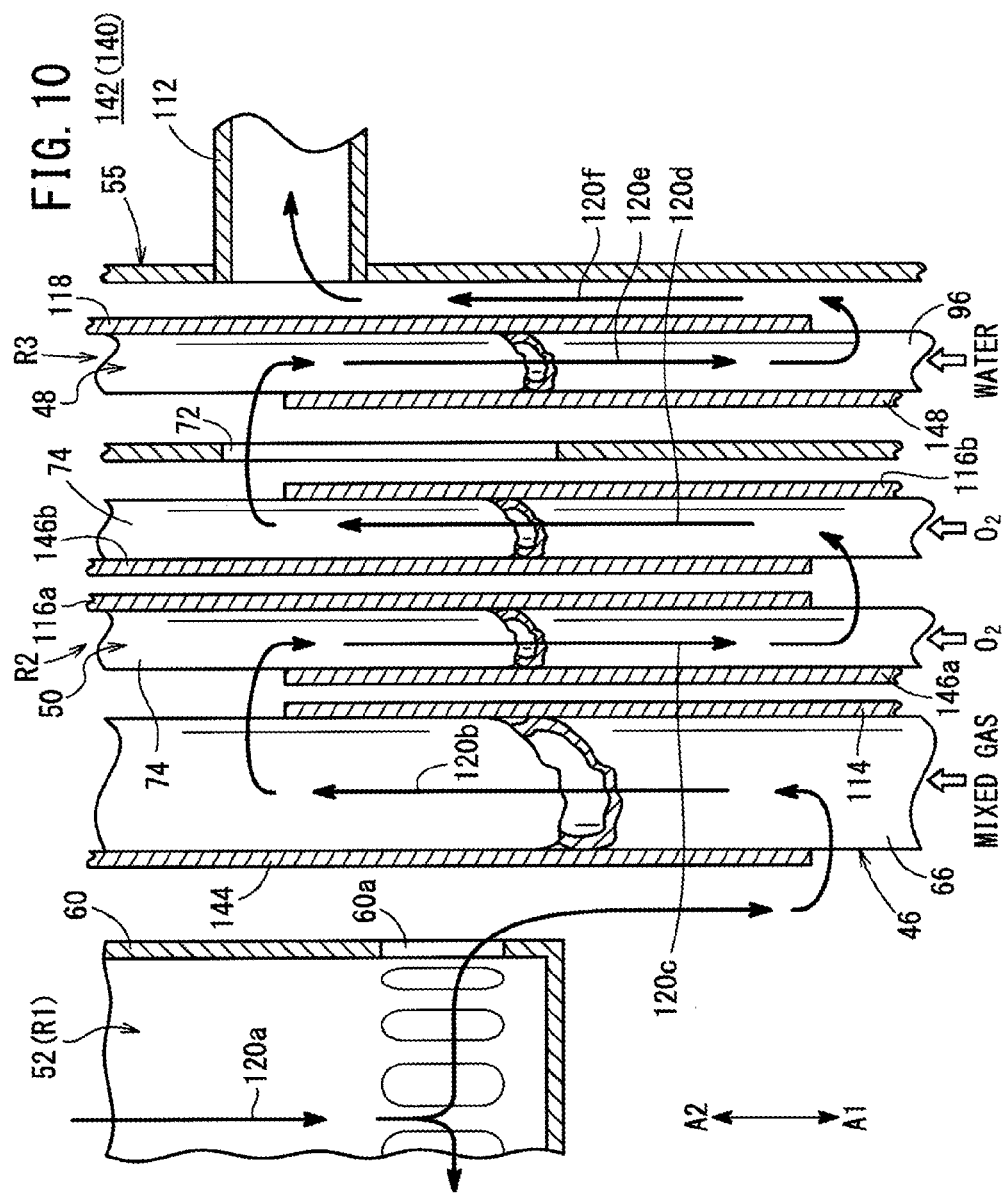
FIG. 10 is a view showing flows of a combustion gas in the FC peripheral equipment.

As shown in FIGS. 8 to 10, a fuel cell module 140 according to a second embodiment of the present invention includes FC peripheral equipment 142. The constituent elements of the fuel cell module 140 according to the second embodiment of the present invention that are identical to those of the fuel cell module 12 according to the first embodiment are labeled with the same reference numeral, and description thereof will be omitted. Also in third to fifth embodiments described later, the constituent elements that are identical to those of the fuel cell module 12 according to the first embodiment are labeled with the same reference numeral, and description thereof will be omitted.

The fuel cell module 140 includes a first inscribed non-uniform-flow suppression plate 144 provided in the second area R2 where the reformer 46 is provided, along the maximum inscribed circle which contacts the outer surfaces of the reforming pipes 66. As in the case of the first circumscribed non-uniform-flow suppression plate 114, the first inscribed non-uniform-flow suppression plate 144 is made of a thin metal plate. The first inscribed non-uniform-flow suppression plate 144 has a cylindrical shape, arranged along the maximum inscribed circle which contacts the outer surfaces of the reforming pipes 66. For example, the first inscribed non-uniform-flow suppression plate 144 is fixed to a first upper ring member 68b by welding or the like.

The ends of the first inscribed non-uniform-flow suppression plate 144 and the first circumscribed non-uniform-flow suppression plate 114 are offset from each other (in a staggered manner) in the pipe length direction of the reforming pipes 66. The combustion gas flows in the pipe length direction of the reforming pipes 66. As shown in FIG. 8, the lower end of the first inscribed non-uniform-flow suppression plate 144 is positioned above the first lower ring member 68a.

Second inscribed non-uniform-flow suppression plates 146a, 146b are provided in the second area R2 where the heat exchanger 50 is provided, along the maximum inscribed circles which contact the outer surfaces of the heat exchange pipes 74. As in the case of the second circumscribed non-uniform-flow suppression plates 116a, 116b, the second inscribed non-uniform-flow suppression plate 146a, 146b are made of thin metal plates. The second inscribed non-uniform-flow suppression plate 146a has a cylindrical shape, arranged along the maximum inscribed circle which contacts the outer surfaces of the heat exchange pipes 74 on the inner side. For example, the second inscribed non-uniform-flow suppression plate 146a is fixed to a first lower ring member 68a by welding or the like.

The upper end of the second inscribed non-uniform-flow suppression plate 146a is spaced downward from the first upper ring member 68b. The ends of the second inscribed non-uniform-flow suppression plate 146a and the second circumscribed non-uniform-flow suppression plate 116a are offset from each other (in a staggered manner) in the pipe length direction of the heat exchange pipes 74. The combustion gas flows in the pipe length direction of the heat exchange pipes 74.

The second inscribed non-uniform-flow suppression plate 146b has a cylindrical shape, arranged along the maximum inscribed circle which contacts the outer surfaces of the heat exchange pipes 74 on the outer side. For example, the second inscribed non-uniform-flow suppression plate 146b is fixed to the first upper ring member 68b by welding or the like. The lower end of the second inscribed non-uniform-flow suppression plate 146b is spaced upward from the first lower ring member 68a. The ends of the second inscribed non-uniform-flow suppression plate 146b and the second circumscribed non-uniform-flow suppression plate 116b are offset from each other (in a staggered manner) in the pipe length direction of the heat exchange pipes 74. The combustion gas flows in the pipe length direction of the heat exchange pipes 74.

A third inscribed non-uniform-flow suppression plate 148 is provided in the third area R3 where the evaporator 48 is provided, along the maximum inscribed circle which contacts the outer surfaces of the evaporation pipes 96. As in the case of the third circumscribed non-uniform-flow suppression plate 118, the third inscribed non-uniform-flow suppression plate 148 is made of a thin metal plate. The third inscribed non-uniform-flow suppression plate 148 has a cylindrical shape, arranged along the maximum inscribed circle which contacts the outer surfaces of the evaporation pipes 96. For example, the third inscribed non-uniform-flow suppression plate 148 is fixed to the lower ring member 98a by welding or the like.

The upper end of the third inscribed non-uniform-flow suppression plate 148 is spaced downward from an upper ring member 98b. The ends of the third inscribed non-uniform-flow suppression plate 148 and the third circumscribed non-uniform-flow suppression plate 118 are offset from each other (in a staggered manner) in the pipe length direction of the evaporation pipes 96. The combustion gas flows in the pipe length direction of the evaporation pipes 96.

As described above, in the second embodiment, at the heat exchanger 50 provided in the second area R2, the second circumscribed non-uniform-flow suppression plates 116a, 116b are provided along the minimum circumscribed circle which contacts the outer surfaces of the heat exchange pipes 74. The second inscribed non-uniform-flow suppression plates 146a, 146b are provided along the maximum inscribed circle which contacts the outer surfaces of the heat exchange pipes 74.

In the structure, as shown in FIG. 10, the combustion gas flows into the second area R2. Thereafter, the combustion gas passes above the second inscribed non-uniform-flow suppression plate 146a, and the combustion gas is blown onto the second circumscribed non-uniform-flow suppression plate 116a. Then, the combustion gas flows along a third combustion gas channel 120c formed between the second circumscribed non-uniform-flow suppression plate 116a and the second inscribed non-uniform-flow suppression plate 146a in the direction indicated by the arrow A1, and the combustion gas is blown onto the outer surfaces of the heat exchange pipes 74 on the inner side.

Further, the combustion gas which has moved to a position below the second circumscribed non-uniform-flow suppression plate 116a passes under the second circumscribed non-uniform-flow suppression plate 116a, and the combustion gas is blown onto the second circumscribed non-uniform-flow suppression plate 116b. The combustion gas flows along a fourth combustion gas channel 120d formed between the second circumscribed non-uniform-flow suppression plate 116b and the second inscribed non-uniform-flow suppression plate 146b in the direction indicated by the arrow A2, and the combustion gas is blown onto the outer surfaces of the heat exchange pipes 74 on the outer side.

In the structure, non-uniform flow and blow-through of the combustion gas supplied to the heat exchanger 50 are suppressed suitably, and the combustion gas flows along the heat exchange pipes 74 still more smoothly and reliably. Accordingly, the quantity of the heat received from the combustion gas by the oxygen-containing gas is increased, and improvement in the heat exchange efficiency is achieved suitably.

Further, the ends of the second circumscribed non-uniform-flow suppression plate 116a and the second inscribed non-uniform-flow suppression plate 146a are offset from each other (in a staggered manner) in the pipe length direction, and the ends of the second circumscribed non-uniform-flow suppression plate 116b and the second inscribed non-uniform-flow suppression plate 146b are offset from each other (in a staggered manner) in the pipe length direction. The combustion gas flows between the second circumscribed non-uniform-flow suppression plate 116a and the second inscribed non-uniform-flow suppression plate 146a, and between the second circumscribed non-uniform-flow suppression plate 116b and the second inscribed non-uniform-flow suppression plate 146b, in the pipe length direction. In the structure, non-uniform flow and blow-through of the combustion gas are suppressed suitably, and the third combustion gas channel 120c and the fourth combustion gas channel 120d for the combustion gas can be lengthened. Accordingly, the quantity of the heat received from the combustion gas is increased, and improvement in the heat exchange efficiency is achieved suitably.

In the meanwhile, at the reformer 46, the combustion gas blown out of the holes 60a into the second area R2 is blown onto the first inscribed non-uniform-flow suppression plate 144, and moves along the first inscribed non-uniform-flow suppression plate 144 in the direction indicated by the arrow A1. The combustion gas passes under the first inscribed non-uniform-flow suppression plate 144, and the combustion gas is blown onto the first circumscribed non-uniform-flow suppression plate 114. Therefore, the combustion gas flows along the second combustion gas channel 120b formed between the first circumscribed non-uniform-flow suppression plate 114 and the first inscribed non-uniform-flow suppression plate 144 in the direction indicated by the arrow A2, and the combustion gas is blown onto the outer surfaces of the reforming pipes 66.

In the structure, non-uniform flow and blow-through of the combustion gas supplied to the reformer 46 are prevented suitably, and the combustion gas flows along the reforming pipes 66 still more smoothly and reliably. Accordingly, the mixed gas receives more heat energy from the combustion gas, and improvement in the heat exchange efficiency is achieved suitably.

Further, the ends of the first circumscribed non-uniform-flow suppression plate 114 and the first inscribed non-uniform-flow suppression plate 144 are offset from each other (in a staggered manner) in the pipe length direction, and the combustion gas flows in the pipe length direction. In the structure, non-uniform flow and blow-through of the combustion gas are suppressed suitably, and the second combustion gas channel 120b can be provided between the first circumscribed non-uniform-flow suppression plate 114 and the first inscribed non-uniform-flow suppression plate 144. Therefore, the second combustion gas channel 120b for the combustion gas can be made sufficiently long. Accordingly, the quantity of the heat received from the combustion gas is increased effectively, and improvement in the heat exchange efficiency is achieved suitably.

Further, the first inscribed non-uniform-flow suppression plate 144 closest to the central axis of the first area R1 is provided adjacent to the exhaust gas combustor 52 in the pipe length direction. In the structure, by the guidance action of the adjacent first inscribed non-uniform-flow suppression plate 144, the combustion gas (exhaust gas) discharged from the exhaust gas combustor 52 flows along the reforming pipes 66 still more smoothly and reliably. Accordingly, the quantity of the heat received from the combustion gas by the mixed gas is increased, and improvement in the heat exchange efficiency is achieved suitably.

In the third area R3 where the evaporator 48 is provided, the combustion gas blown out of the opening 72 passes above the third inscribed non-uniform-flow suppression plate 148, and the combustion gas is blown onto the third circumscribed non-uniform-flow suppression plate 118. The combustion gas moves along the fifth combustion gas channel 120e formed between the third circumscribed non-uniform-flow suppression plate 118 and the third inscribed non-uniform-flow suppression plate 148 in the direction indicated by the arrow A1, and the combustion gas is blown onto the outer surfaces of the evaporation pipes 96.

Thus, non-uniform flow and blow-through of the combustion gas supplied to the evaporator 48 are suppressed suitably, and the combustion gas flows along each of the evaporation pipes 96 still more smoothly and reliably. Accordingly, the quantity of the heat received from the combustion gas by the water is increased, and improvement in the heat exchange efficiency is achieved suitably.

Further, the end of the third circumscribed non-uniform-flow suppression plate 118 and the end of the third inscribed non-uniform-flow suppression plate 148 are offset from each other in the pipe length direction, and the combustion gas flows in the pipe length direction. In the structure, non-uniform flow and blow-through of the combustion gas are suppressed suitably, and the fifth combustion gas channel 120e can be provided between the third circumscribed non-uniform-flow suppression plate 118 and the third inscribed non-uniform-flow suppression plate 148. Therefore, the fifth combustion gas channel 120e for the combustion gas can be lengthened. Accordingly, the quantity of the heat received from the combustion gas is increased effectively, and improvement in the heat exchange efficiency is achieved suitably.

Figure 11:
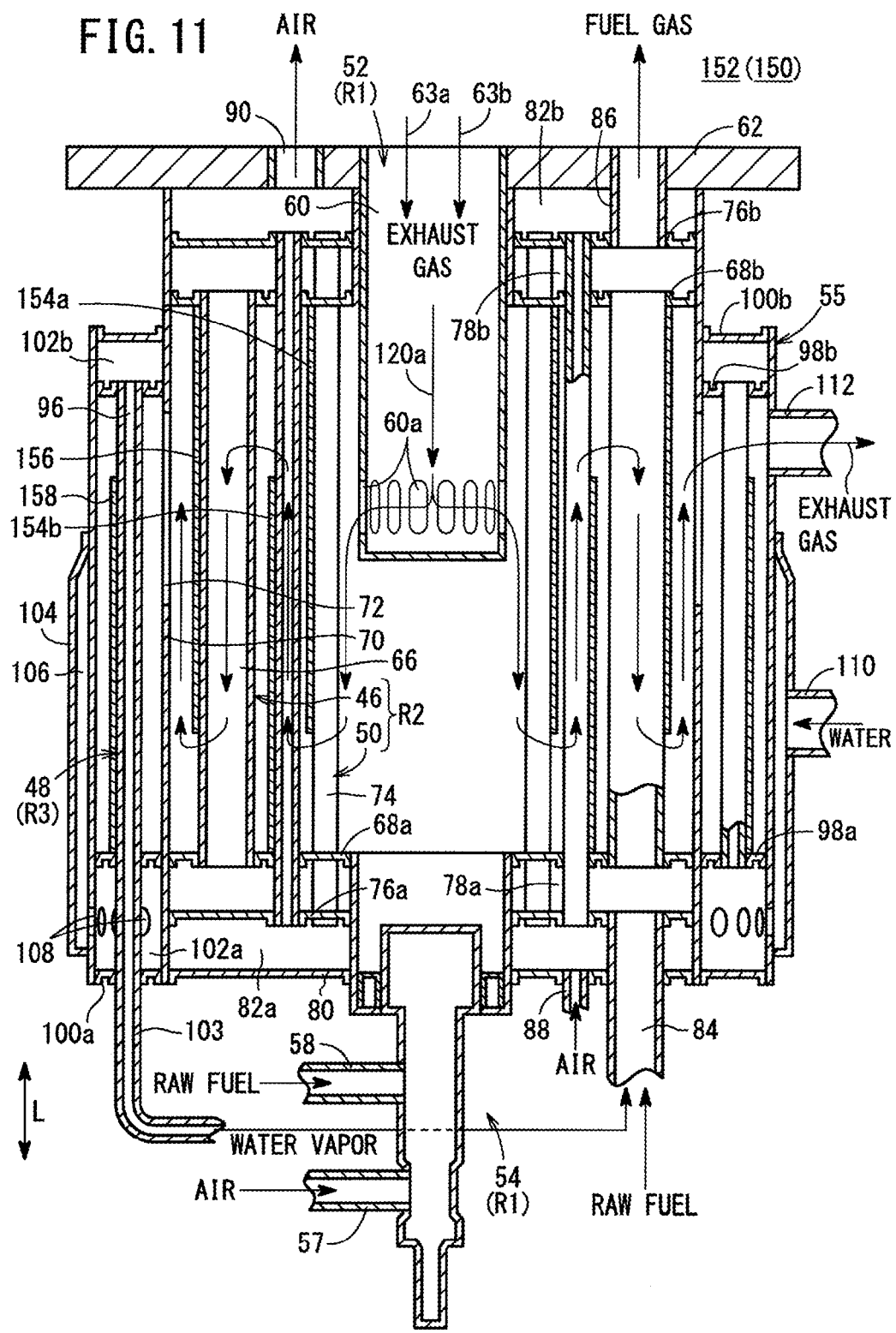
FIG. 11 is a cross sectional view showing FC peripheral equipment of a fuel cell module according to a third embodiment of the present invention.

FIG. 11 is a cross sectional view showing FC peripheral equipment 152 of a fuel cell module 150 according to a third embodiment of the present invention.

Figure 12:
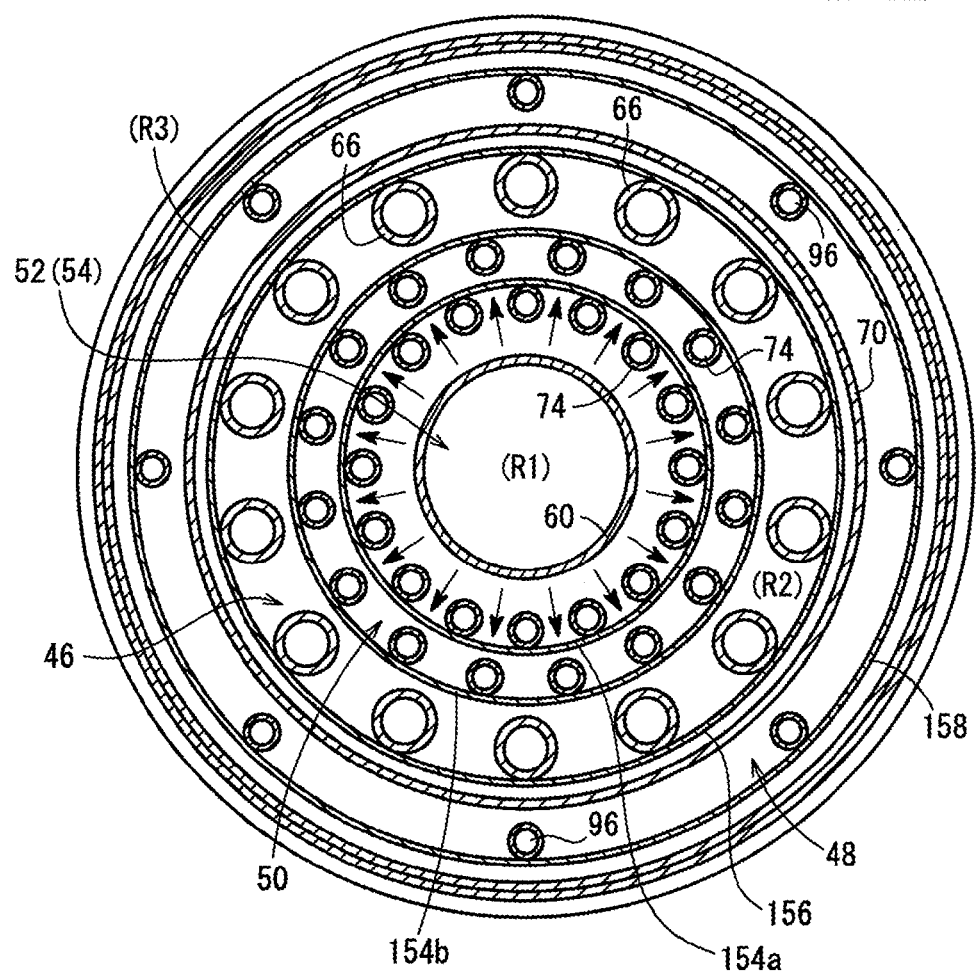
FIG. 12 is a cross sectional plan view showing the FC peripheral equipment.

As shown in FIGS. 11 and 12, in the second area R2 of the FC peripheral equipment 152, the reformer 46 is provided outside the heat exchanger 50 in a radial direction. The heat exchanger 50 includes a plurality of heat exchange pipes 74 arranged in a staggered pattern on two virtual circles concentrically around the first area R1. The reformer 46 includes reforming pipes 66 arranged on a virtual circle outside the circle arrays of the heat exchange pipes 74 concentrically around the first area R1.

In the heat exchanger 50, a first circumscribed non-uniform-flow suppression plate 154a is provided to contact the outer surfaces of the heat exchange pipes 74 on the inner side, and a first circumscribed non-uniform-flow suppression plate 154b is provided to contact the outer surfaces of the heat exchange pipes 74 on the outer side. The first circumscribed non-uniform-flow suppression plate 154a closest to the central axis of the first area R1 has a cylindrical shape, and the first circumscribed non-uniform-flow suppression plate 154a is fixed to the first upper ring member 68b such that the first circumscribed non-uniform-flow suppression plate 154a is provided adjacent to the exhaust gas combustor 52. The first circumscribed non-uniform-flow suppression plate 154b has a cylindrical shape, and the first circumscribed non-uniform-flow suppression plate 154b is fixed to the first lower ring member 68a.

In the reformer 46, a second circumscribed non-uniform-flow suppression plate 156 is provided along the minimum circumscribed circle which contacts the outer surfaces of the reforming pipes 66. The second circumscribed non-uniform-flow suppression plate 156 has a cylindrical shape, and the second circumscribed non-uniform-flow suppression plate 156 is fixed to the first upper ring member 68b.

In the evaporator 48, a third circumscribed non-uniform-flow suppression plate 158 is provided along the minimum circumscribed circle which contacts the outer surfaces of the evaporation pipes 96. The third circumscribed non-uniform-flow suppression plate 158 has a cylindrical shape, and the third circumscribed non-uniform-flow suppression plate 158 is fixed to the lower ring member 98a.

In the third embodiment, the same advantages as in the case of the first embodiment are obtained. Further, in the third embodiment, as in the case of the second embodiment, the circumscribed non-uniform-flow suppression plate and the inscribed non-uniform-flow suppression plate can be provided in combination. It is sufficient that the circumscribed non-uniform-flow suppression plate and the inscribed non-uniform-flow suppression plate are provided at least in the heat exchanger 50.

Figure 13:
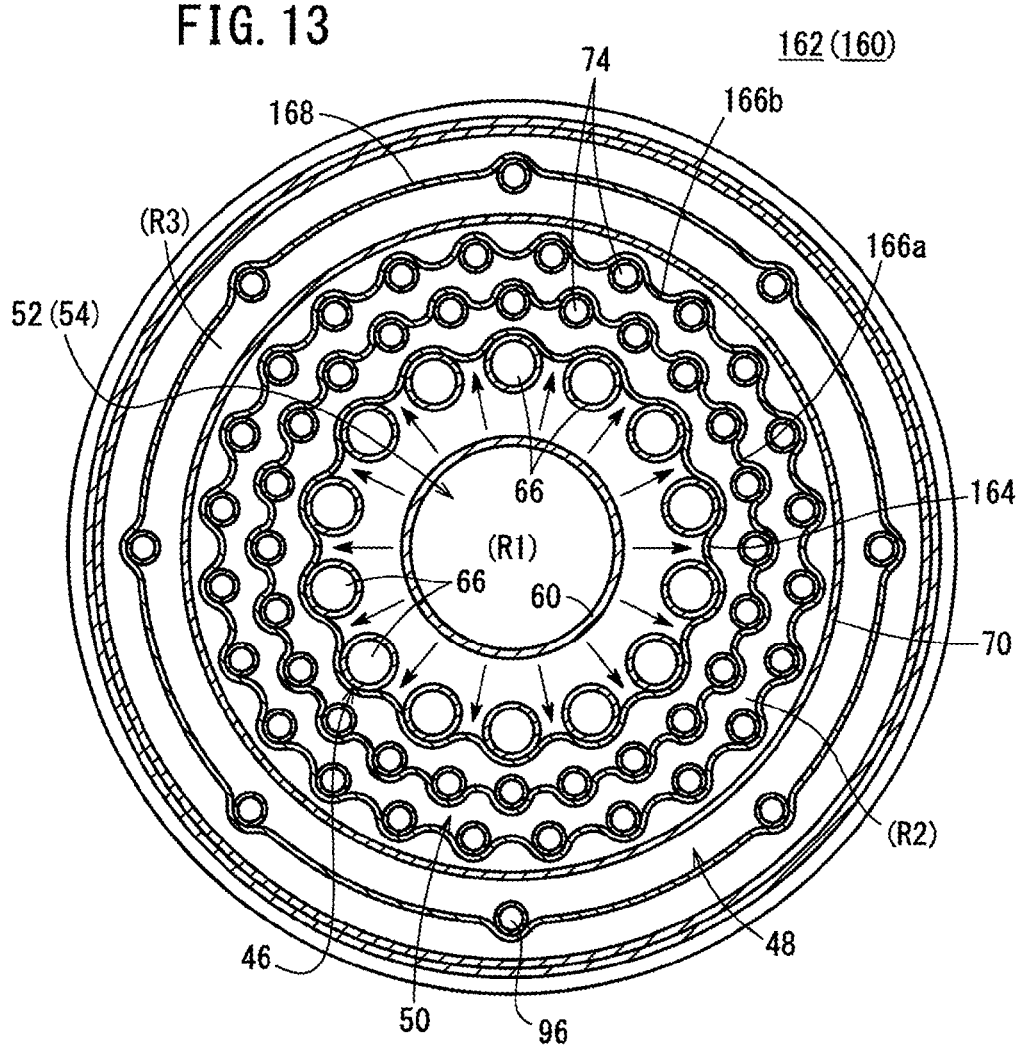
FIG. 13 is a cross sectional plan view showing FC peripheral equipment of the fuel cell module according to a fourth embodiment of the present invention.

As shown in FIG. 13, FC peripheral equipment 162 of a fuel cell module 160 according to a fourth embodiment of the present invention includes a first circumscribed non-uniform-flow suppression plate 164, second circumscribed non-uniform-flow suppression plates 166a, 166b, and a third circumscribed non-uniform-flow suppression plate 168. The first circumscribed non-uniform-flow suppression plate 164 has a substantially wavy shape, arranged along the minimum circumscribed circle which contacts the outer surfaces of the reforming pipes 66, including protrusions protruding between the reforming pipes 66.

Each of the second circumscribed non-uniform-flow suppression plates 166a, 166b has a substantially wavy shape, arranged along the minimum circumscribed circle which contacts the outer surfaces of the heat exchange pipes 74, including protrusions protruding between the heat exchange pipes 74.

The third circumscribed non-uniform-flow suppression plates 168 has a substantially wavy shape, arranged along the minimum circumscribed circle which contacts the outer surfaces of the evaporation pipes 96, including protrusions protruding between the evaporation pipes 96.

In the fourth embodiment, for example, each of the circumscribed non-uniform-flow suppression plates 166a, 166b has a substantially wavy shape to contact the outer surfaces of the heat exchange pipes 74. In the structure, further improvement in the heat exchange efficiency between the combustion gas and the oxygen-containing gas is achieved suitably, and thermally self-sustaining operation is facilitated.

Figure 14:
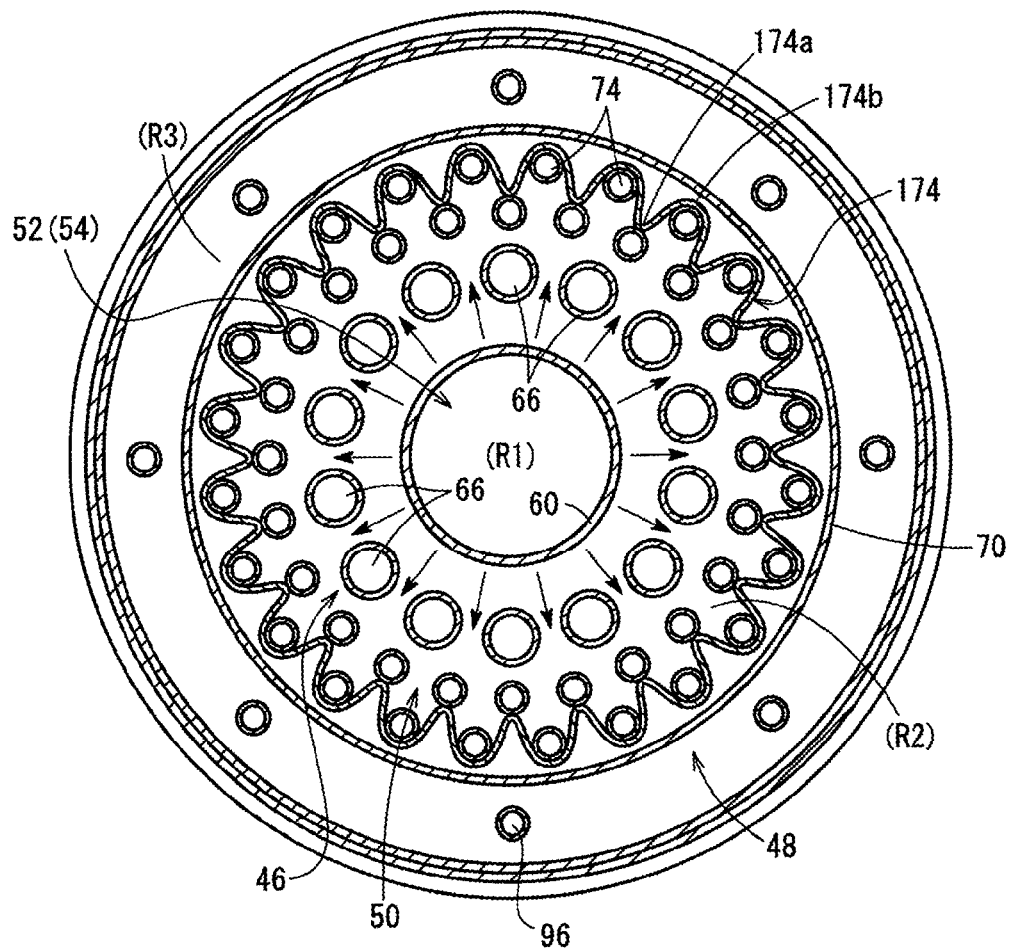
FIG. 14 is a cross sectional plan view showing FC peripheral equipment of the fuel cell module according to a fifth embodiment of the present invention.
Figure 15:
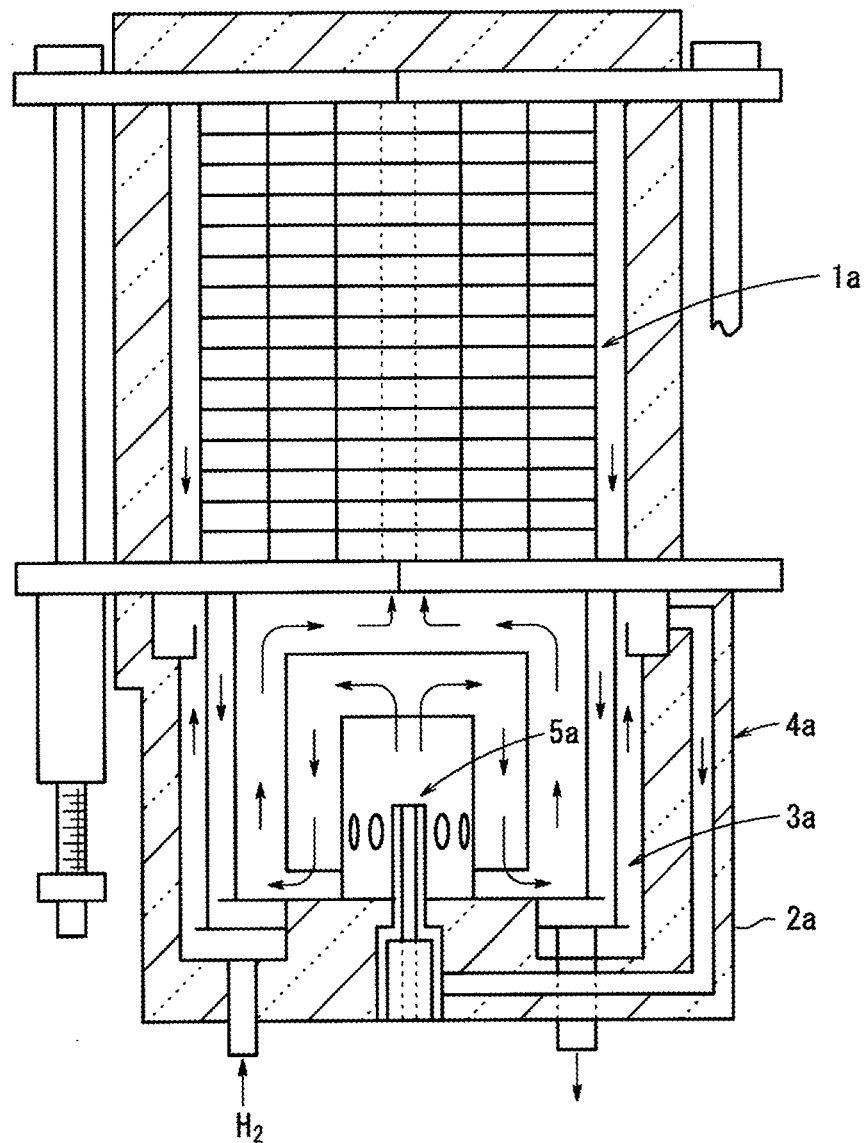
FIG. 15 is a view schematically showing a fuel cell battery disclosed in the conventional technique 1.
Figure 16:
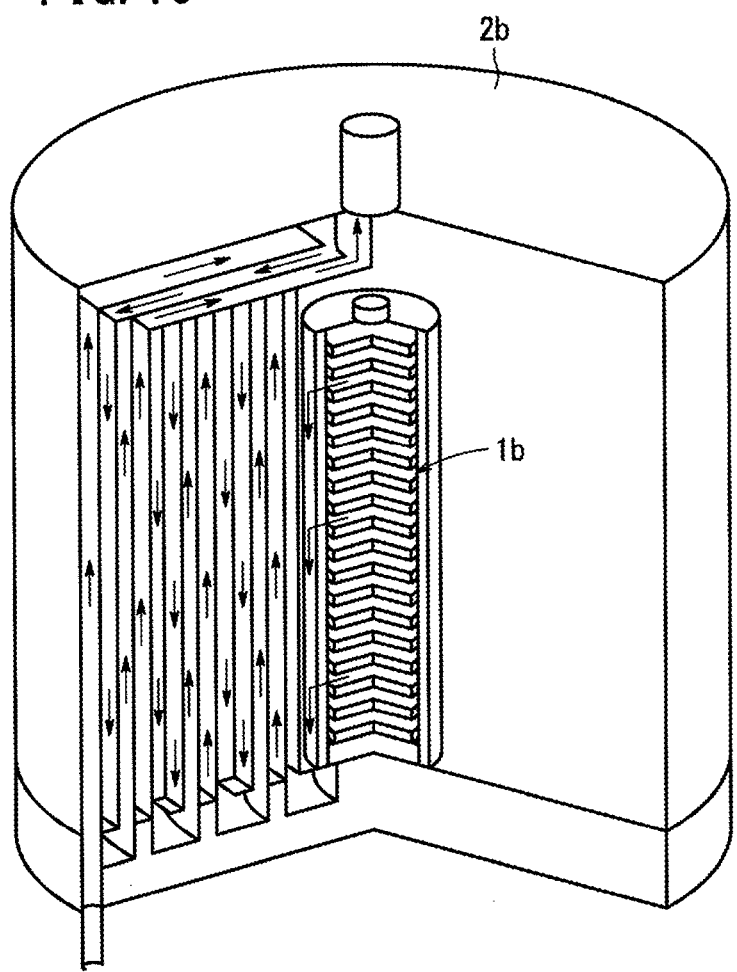
FIG. 16 is a perspective view with partial cutout, showing a solid oxide fuel cell disclosed in the conventional technique 2.
Figure 17:
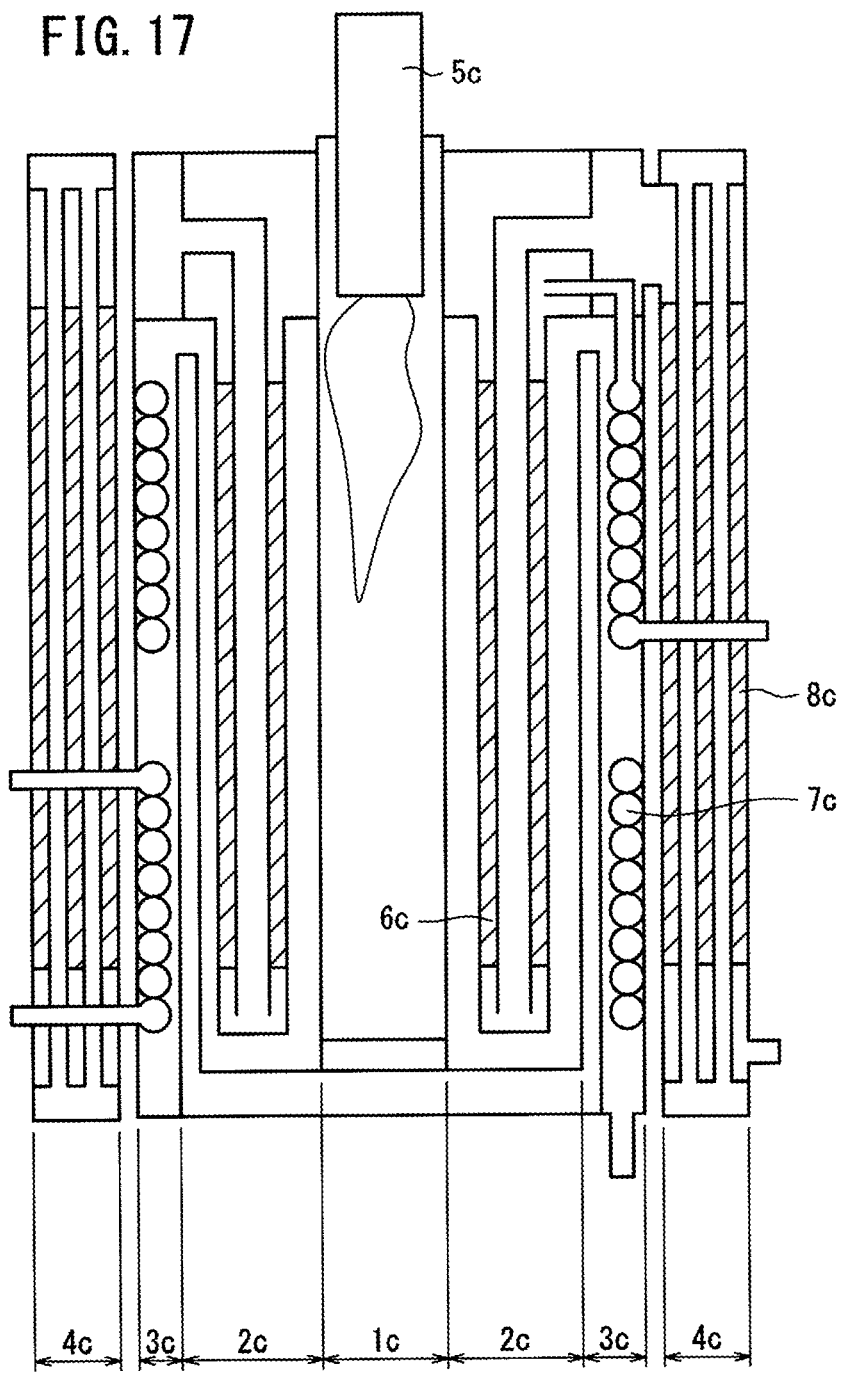
FIG. 17 is a view schematically showing a fuel cell system disclosed in the conventional technique 3.

As shown in FIG. 14, FC peripheral equipment 172 of a fuel cell module 170 according to a fifth embodiment of the present invention includes a circumscribed non-uniform-flow suppression plate 174 in correspondence with the heat exchanger 50.

The circumscribed non-uniform-flow suppression plate 174 has a substantially wavy shape. The circumscribed non-uniform-flow suppression plate 174 includes inner curved portions 174a and outer curved portions 174b alternately. The inner curved portions 174a are arranged along the minimum circumscribed circle which contacts the outer surfaces of the heat exchange pipes 74 on the inner side, and the outer curved portions 174b are arranged along the minimum circumscribed circle which contacts the outer surfaces of the heat exchange pipes 74 on the outer side.

In the fifth embodiment, the single circumscribed non-uniform-flow suppression plate 174 can contact both of the outer surfaces of the heat exchange pipes 74 on the inner side and the outer surfaces of the heat exchange pipes 74 on the outer side. Accordingly, with the further simple and economical structure, improvement in the heat exchange efficiency is achieved.

The invention claimed is:

1. A fuel cell module comprising:
   a fuel cell stack formed by stacking a plurality of fuel cells for generating electricity by electrochemical reactions of a fuel gas and an oxygen-containing gas;
   a reformer for reforming a mixed gas of a raw fuel chiefly containing hydrocarbon and water vapor to produce the fuel gas supplied to the fuel cell stack;
   an evaporator for evaporating water, and supplying the water vapor to the reformer;
   a heat exchanger for raising the temperature of the oxygen-containing gas by heat exchange with a combustion gas, and supplying the oxygen-containing gas to the fuel cell stack;
   an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and a start-up combustor for combusting the raw fuel and the oxygen-containing gas to produce the combustion gas, wherein the fuel cell module includes:

a first area where the exhaust gas combustor and the start-up combustor are provided;

an annular second area around the first area and where the reformer and the heat exchanger are provided; and an annular third area around the second area and where the evaporator is provided, and wherein the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber and another end connected to the oxygen-containing gas discharge chamber, and a combustion gas channel for supplying the combustion gas between the heat exchange pipes; and a circumscribed non-uniform-flow suppression plate is provided along a minimum circumscribed circle which contacts outer surfaces of the heat exchange pipes.

2. The fuel cell module according to claim 1, wherein the reformer includes an annular mixed gas supply chamber to which the mixed gas is supplied, an annular fuel gas discharge chamber to which the produced fuel gas is discharged, a plurality of reforming pipes each having one end connected to the mixed gas supply chamber and another end connected to the fuel gas discharge chamber, and a combustion gas channel for supplying the combustion gas between the reforming pipes; and a circumscribed non-uniform-flow suppression plate is provided along a minimum circumscribed circle which contacts outer surfaces of the reforming pipes.

3. The fuel cell module according to claim 1, wherein the evaporator includes an annular water supply chamber to which the water is supplied, an annular water vapor discharge chamber to which the water vapor is discharged, a plurality of evaporation pipes each having one end connected to the water supply chamber and another end connected to the water vapor discharge chamber, and a combustion gas channel for supplying the combustion gas between the evaporation pipes; and a circumscribed non-uniform-flow suppression plate is provided along a minimum circumscribed circle which contacts outer surfaces of the evaporation pipes.

4. The fuel cell module according to claim 2, wherein an inscribed non-uniform-flow suppression plate is provided along a maximum inscribed circle which contacts the outer surfaces.

5. The fuel cell module according to claim 4, wherein ends of the circumscribed non-uniform-flow suppression plate and the inscribed non-uniform-flow suppression plate are offset from each other in a pipe length direction, and the combustion gas flows between the circumscribed non-uniform-flow suppression plate and the inscribed non-uniform-flow suppression plate in the pipe length direction.

6. The fuel cell module according to claim 5, wherein, one of the circumscribed non-uniform-flow suppression plate and the inscribed non-uniform-flow suppression plate that is closest to the central axis of the first area is provided adjacent to the exhaust gas combustor in the pipe length direction.

7. The fuel cell module according to claim 1, wherein the fuel cell module is a solid oxide fuel cell module.

* * * * *